United States Patent
Mishima et al.

(10) Patent No.: US 12,447,725 B2
(45) Date of Patent: Oct. 21, 2025

(54) CURABLE RESIN MULTILAYER BODY, DRY FILM, CURED PRODUCT AND ELECTRONIC COMPONENT

(71) Applicant: TAIYO HOLDINGS CO., LTD., Hiki-gun (JP)

(72) Inventors: Shoko Mishima, Hiki-gun (JP); Shoya Sekiguchi, Hiki-gun (JP); Kota Oki, Hiki-gun (JP); Nobuhiro Ishikawa, Hiki-gun (JP)

(73) Assignee: TAIYO HOLDINGS CO., LTD., Hiki-gun (JP)

( * ) Notice: Subject to any disclaimer, the term of this patent is extended or adjusted under 35 U.S.C. 154(b) by 197 days.

(21) Appl. No.: 18/552,743

(22) PCT Filed: Mar. 31, 2022

(86) PCT No.: PCT/JP2022/016760
§ 371 (c)(1),
(2) Date: Sep. 27, 2023

(87) PCT Pub. No.: WO2022/211071
PCT Pub. Date: Oct. 6, 2022

(65) Prior Publication Data
US 2024/0165934 A1    May 23, 2024

(30) Foreign Application Priority Data

Mar. 31, 2021  (JP) ................. 2021-062055
Mar. 31, 2021  (JP) ................. 2021-062056
Mar. 31, 2021  (JP) ................. 2021-062057

(51) Int. Cl.
*B32B 27/28* (2006.01)
*B32B 27/08* (2006.01)
*B32B 27/20* (2006.01)
*C08L 71/12* (2006.01)

(52) U.S. Cl.
CPC ............ *B32B 27/285* (2013.01); *B32B 27/08* (2013.01); *B32B 27/20* (2013.01); *C08L 71/12* (2013.01); *B32B 2250/02* (2013.01); *B32B 2250/24* (2013.01); *B32B 2264/1021* (2020.08); *B32B 2307/204* (2013.01); *B32B 2307/206* (2013.01); *B32B 2307/732* (2013.01); *B32B 2371/00* (2013.01); *B32B 2457/08* (2013.01)

(58) Field of Classification Search
CPC ........ B32B 27/285; C08L 71/10; C08L 71/12; C08L 71/123; C08L 71/126
See application file for complete search history.

(56) References Cited

U.S. PATENT DOCUMENTS

| | | |
|---|---|---|
| 2007/0020447 A1 | 1/2007 | Yamaguchi et al. |
| 2021/0301129 A1 | 9/2021 | Nosaka et al. |

FOREIGN PATENT DOCUMENTS

| | | | |
|---|---|---|---|
| JP | 11-227077 A | 8/1999 | |
| JP | 2003-17861 A | 1/2003 | |
| JP | 2005-88873 A | 4/2005 | |
| JP | 2020-55998 A | 4/2020 | |
| JP | 2020-196853 A | 12/2020 | |
| WO | WO-2020017570 A1 * | 1/2020 | ............ C08L 101/12 |
| WO | WO 2022/034871 A1 | 2/2022 | |
| WO | WO 2022/034872 A1 | 2/2022 | |

OTHER PUBLICATIONS

International Search Report issued May 31, 2022 in PCT/JP2022/016760 filed on Mar. 31, 2022, 2 pages.
Nunoshige et al., "Efficient Oxidative Coupling Polymerization for Synthesis of Thermosetting Poly(phenylene ether) Copolymer with a Low Dielectric Loss" J. Polym. Sci. Part A: Polym. Chem. 2008, 46, pp. 5278-5282.
International Preliminary Report on Patentability and Written Opinion issued Oct. 12, 2023 in PCT/JP2022/016760 (submitting English translation only), 6 pages.

\* cited by examiner

*Primary Examiner* — Zachary M Davis
(74) *Attorney, Agent, or Firm* — Oblon, McClelland, Maier & Neustadt, L.L.P.

(57) ABSTRACT

Provided is a curable resin laminate capable of easily producing an insulating layer having low dielectric properties and excellent adhesion (peel strength) to a conductor layer. A curable resin laminate includes: a first resin layer including a first curable composition, and a second resin layer including a second curable composition and laminated on the first resin layer. The second resin layer has a thickness of 5 to 35% relative to a total thickness of the first resin layer and the second resin layer, the first curable composition contains (A1) a polyphenylene ether and a filler, and a content rate ($M_{B1}$) of the filler is 30% by mass or more relative to a total solid content. The second curable composition contains (A2) a polyphenylene ether, and a content rate ($M_{B2}$) of a filler is 40% by mass or less relative to a solid content, $M_{B1} > M_{B2}$, and (A1) and (A2) have a slope that is less than 0.6, calculated by a conformation plot.

6 Claims, No Drawings

CURABLE RESIN MULTILAYER BODY, DRY FILM, CURED PRODUCT AND ELECTRONIC COMPONENT

CROSS-REFERENCE TO RELATED APPLICATIONS

This application is a national stage application of International Application No. PCT/JP2022/016760, filed Mar. 31, 2022, which is based upon and claims the benefit of priority to Japanese Patent Application No. 2021-062055, filed Mar. 31, 2021, Japanese Patent Application No. 2021-062056, filed Mar. 31, 2021 and Japanese Patent Application No. 2021-062057, filed Mar. 31, 2021. The entire contents of these applications are incorporated herein by reference.

TECHNICAL FIELD

The present invention relates to a curable resin laminate, a dry film having the curable resin laminate, a cured product of the curable resin laminate or of a curable resin laminate obtained using the dry film, and an electronic component that are useful for producing an interlayer insulating layer in an electronic component such as a printed wiring board (hereinafter, also simply referred to as "wiring board").

BACKGROUND ART

In recent years, with the spread of large-capacity high-speed communication represented by the fifth generation communication system (5G), millimeter wave radars for an advanced driving system (ADAS) of automobiles, and the like, higher frequencies of signals for electronic devices have been sought for.

In such a wiring board built in an electronic device, a curable resin composition containing an epoxy resin or the like as a main component has been used as an insulating material, but a cured product including such a composition has a high relative permittivity (Dk) and a high dielectric loss tangent (Df), and has increased transmission loss with respect to signals in a high frequency band, causing problems such as signal attenuation and heat generation. Therefore, polyphenylene ethers excellent in low dielectric properties have attracted attention.

Non Patent Literature 1 proposes a polyphenylene ether in which heat resistance is improved by introducing an allyl group into a molecule of the polyphenylene ether to form a thermosetting resin.

CITATION LIST

Non Patent Literature

Non Patent Literature 1: J. Nunoshige, H. Akahoshi, Y. Shibasaki, M. Ueda, J. Polym. Sci. Part A: Polym. Chem. 2008, 46, 5278-5282.

SUMMARY OF INVENTION

Technical Problem

However, when the polyphenylene ether is used as an insulating film for a wiring board, for example, an interlayer insulating material sandwiched between upper and lower conductor layers such as a copper-clad laminate (CCL), there is such a problem in that adhesion to copper foil used for such a conductor layer, so-called peel strength, cannot be sufficiently obtained.

An object of the present invention is to provide a curable resin laminate useful for forming an insulating layer having low dielectric properties and excellent adhesion (peel strength) to a conductor layer.

Solution to Problem

The inventors of the present invention have found that the above problem can be solved by a multilayer structure in which the thickness configuration of each layer is in a specific range, a curable composition forming each layer containing a polyphenylene ether having a branched structure, and the filler content being in a specific range, and have completed the present invention. That is, the present invention is as follows.

The present invention relates to:
a curable resin laminate including: a first resin layer including a first curable composition; and a second resin layer including a second curable composition and laminated on at least one surface of a main surface of the first resin layer, wherein
the second resin layer has a thickness of 5 to 35% relative to a total thickness of the first resin layer and the second resin layer,
the first curable composition contains (A1) a polyphenylene ether and (B1) a filler, and a content ($M_{B1}$) of (B1) the filler is 30% by mass or more relative to a total solid content in the composition
the second curable composition contains (A2) a polyphenylene ether and does not contain (B2) a filler, or a content ($M_{B2}$) of (B2) a filler is 40% by mass or less relative to a total solid content in the composition,
a relationship between (B1) the filler content ($M_{B1}$) and (B2) the filler content ($M_{B2}$) is $M_{B1} > M_{B2}$, and
(A1) the polyphenylene ether and (A2) the polyphenylene ether are polyphenylene ethers obtained from raw material phenols containing phenols satisfying at least a condition 1 and having a slope that is less than 0.6, calculated by a conformation plot.
(Condition 1)
Having hydrogen atoms at ortho and para positions
The present invention may be a dry film including the curable resin laminate.
The present invention may be a cured product composed of the curable resin laminate.
The present invention may be an electronic component including the cured product.

Advantageous Effects of Invention

The present invention can provide a curable resin laminate useful for forming an insulating layer having low dielectric properties and excellent adhesion (peel strength) to a conductor layer.

DESCRIPTION OF EMBODIMENTS

Hereinafter, a curable resin laminate that is a laminate structure including at least two resin layers will be described, but the present invention is not limited thereto at all.

If isomers are present in the compounds described, all isomers that may be present are usable in the present invention unless otherwise indicated.

In the present invention, phenols that can be used as a raw material of a polyphenylene ether (PPE) and can be a constituent unit of the polyphenylene ether are collectively referred to as "raw material phenols".

In the present invention, when raw material phenols are described with "ortho position", "para position", or the like, unless otherwise specified, the position of the phenolic hydroxyl group is used as a reference (ipso position).

In the present invention, when simply represented as "ortho position" or the like, "at least one of ortho positions" or the like is indicated. Therefore, as long as there is no particular contradiction, the term "ortho position" may be interpreted as indicating either one of the ortho positions or may be interpreted as indicating both of the ortho positions.

In the present invention, a polyphenylene ether in which some or all functional groups (for example, a hydroxyl group) of the polyphenylene ether are modified may be simply referred to as a "polyphenylene ether". Therefore, the phrase "polyphenylene ether" includes both an unmodified polyphenylene ether and a modified polyphenylene ether unless there is a particular contradiction.

In the present description, monovalent phenols are mainly disclosed as the raw material phenols, but polyvalent phenols may be used as the raw material phenols as long as the effect of the present invention is not inhibited.

In the present description, when the upper limit value and the lower limit value of the numerical range are described separately, all combinations of each lower limit value and each upper limit value are substantially described within a range that does not contradict each other.

In the present description, the solid content is used to mean a nonvolatile content (a component other than a volatile component such as a solvent).

Hereinafter, the configuration and components of the curable resin laminate, the effect of the curable resin laminate, a method for producing the curable resin laminate, the applications of the curable resin laminate, and the like will be described.

In the following description, the components contained in the curable composition and the components contained in the curable resin layer that is a dry coating film of the curable composition may be described without distinction.

<<<<<<<Configuration and Components of Curable Resin Layer>>>>>>>

The curable resin laminate of the present invention includes a first resin layer and a second resin layer laminated (directly) on at least one surface of the main surface of the first resin layer.

The second resin layer has a thickness of 5 to 35% relative to the total thickness of the first resin layer and the second resin layer.

The first resin layer and the second resin layer contain polyphenylene ether.

The first resin layer essentially contains a filler, but the second resin layer may or may not contain a filler.

A configuration is preferably such that the second resin layer (1) does not contain a filler, or (2) when the second resin layer contains a filler, the content of the filler in the second resin layer is lower than the content of the filler in the first resin layer.

The curable resin laminate of the present invention is typically used such that the second resin layer is in contact with an adherend such as copper foil (copper circuit). Therefore, in the case of a laminate of two layers including the first resin layer and the second resin layer, the resin layer is disposed on the first resin layer side so as to be in contact with a substrate such as a wiring board, and the second resin layer is used so as to be in contact with an adherend such as copper foil (copper circuit).

In the curable resin laminate of the present invention, a base film composed of polyethylene terephthalate, polypropylene, or the like, or another resin layer may be laminated on the outer layer of the first resin layer and/or the second resin layer. Two or more base films and other layers may be provided.

It suffices if the curable resin laminate of the present invention is a laminate satisfying the above configuration, and for example, may be a laminate including at least three layers in which the second resin layer, the first resin layer, and the second resin layer are laminated in this order.

When the curable resin laminate of the present invention has two layers of the second resin layer, for example, the thicknesses, materials, and the like of the respective second resin layers may be the same or different as long as the following conditions A, B, and/or C are satisfied.

(Condition A)

The second resin layers are configured such that the combined thickness of the second resin layers is (1) 10 to 70% of the combined thickness of the first resin layer and the second resin layers, and a single layer of the second resin layers (2) does not contain the filler, or the content of the filler in the second resin layers is 40% by mass or less relative to the total solid content in the composition, and the content of the filler in the second resin layers is smaller than the content of the filler in the first resin layer.

(Condition B)

The second resin layers are configured such that the combined thickness of the second resin layers is 10 to 70% of the combined thickness of the first resin layer and the second resin layers, and each resin layer satisfies a predetermined melt viscosity as a cured product.

(Condition C)

The second resin layers are configured such that the combined thickness of the second resin layers is 10 to 70% of the combined thickness of the first resin layer and the second resin layers, and each resin layer satisfies a predetermined Young's modulus as a cured product.

<<<<<Configuration>>>>>
<<<<<Configuration: First Resin Layer>>>>>

The first resin layer of the present invention contains (A1) a polyphenylene ether and (B1) a filler.

In addition, the content $M_{B1}$ of (B1) the filler relative to the total solid content in the first resin layer is preferably 30% by mass or more.

According to another expression, the first resin layer is a dry coating film obtained from the first curable composition containing (A1) the polyphenylene ether and (B1) the filler.

The first resin layer is preferably a dry coating film having 30% by mass or more of the content $M_{B1}$ of (B1) the filler relative to the total solid content in the first curable composition.

The content $M_{B1}$ of (B1) the filler is more preferably 30 to 80% by mass, further preferably 50 to 80% by mass, and particularly preferably 65 to 80% by mass from the viewpoint of low thermal expansion.

The content MAI of (A1) the polyphenylene ether relative to the total solid content in the first resin layer is preferably 3 to 40% by mass, more preferably 5 to 30% by mass, still more preferably 7 to 25% by mass, and particularly preferably 9 to 20% by mass.

In addition, the first resin layer may contain (C1) other components.

(A1) The polyphenylene ether, (B1) the filler, and (C1) the other components will be described later.

The thickness $T_1$ of the first resin layer is larger than the thickness $T_2$ of the second resin layer. The thickness $T_1$ of the first resin layer is, for example, preferably 1 to 50 μm, more preferably 10 to 45 μm, still more preferably 20 to 30 μm, and particularly preferably 24 to 29 μm.

<<<<Configuration: Second Resin Layer>>>>

The second resin layer of the present invention contains (A2) the polyphenylene ether.

The second resin layer may contain (B2) the filler or may not contain (B2) the filler.

It is preferable that the second resin layer does not contain (B2) the filler, or the content ($M_{B2}$) of (B2) the filler is 40% by mass or less relative to the total solid content in the composition, and the relationship between the content ($M_{B1}$) of (B1) the filler and the content ($M_{B2}$) of (B2) the filler is $M_{B1}>M_{B2}$.

According to another expression, the second resin layer is a dry coating film obtained from the second curable composition containing (A2) the polyphenylene ether.

It is preferable that the second resin layer is a dry coating film obtained from the second curable composition containing no (B2) filler or a dry coating film obtained from the second curable composition in which the content $M_{B2}$ of (B2) the filler relative to the total solid content in the second curable composition is 40% by mass or less, and the relationship between the content $M_{B1}$ of (B1) the filler and the content $M_{B2}$ of (B2) the filler is $M_{B1}>M_{B2}$.

The ratio ($M_{B2}/M_{B1}$) of [the content $M_{B2}$ of (B2) the filler relative to the total solid content in the second curable composition] to [the content $M_{B1}$ of (B1) the filler relative to the total solid content in the first curable composition] is more preferably 50% or less, further preferably 45% or less, and still more preferably 15% or less from the viewpoint of achieving low dielectric properties.

The content $M_{B2}$ of (B2) the filler in the second resin layer and the second curable composition is more preferably 35% by mass or less.

When the second resin layer and the second curable composition contain (B2) the filler, the content $M_{B2}$ of (B2) the filler is preferably 5 to 35% by mass and more preferably 20 to 35% by mass because of excellent balance between low thermal expansion and adhesion to the conductor layer.

The content $M_{A2}$ of (A2) the polyphenylene ether relative to the total solid content (or the total solid content of the second curable composition) in the second resin layer is preferably 10 to 50% by mass and more preferably 30 to 50% by mass.

In addition, the second resin layer may contain (C2) other components.

(A2) The polyphenylene ether, (B2) the filler, and (C2) the other components will be described later.

For the thickness $T_2$ of the second resin layer, the ratio ($T_2/(T_1+T_2)$) of [the thickness $T_2$ of the second resin layer] to [total thickness ($T_1+T_2$) of thickness ($T_1$) of first resin layer and thickness ($T_2$) of second resin layer] is 5 to 35%, preferably 10 to 25%, and more preferably 15 to 25%. The ratio of the thickness $T_2$ of the second resin layer is within the above range, allowing to provide stable adhesion to the conductor layer.

The thickness $T_2$ of the second resin layer is smaller than the thickness $T_1$ of the first resin layer, and is, for example, preferably 0.5 to 40 μm, more preferably 0.7 to 30 μm, still more preferably 1 to 20 μm, and particularly preferably 3 to 10 μm.

<<<<<Physical Properties>>>>>
<<<<<Melt Viscosity>>>>>

The first resin layer has a melt viscosity ($MV_1$) at 140° C. of preferably more than 20,000 dPa·s, more preferably more than 25,000 dPa·s, and particularly preferably more than 30,000 dPa·s. The upper limit value of the melt viscosity ($MV_1$) is not particularly limited, and is, for example, 500,000 dPa·s.

The second resin layer preferably has a melt viscosity ($MV_2$) at 140° C. of 40,000 dPa·s or less. The lower limit value of the melt viscosity ($MV_2$) is not particularly limited, and is, for example, 10,000 dPa·s.

In addition, the relationship between the melt viscosity ($MV_1$) of the first resin layer at 140° C. and the melt viscosity ($MV_2$) of the second resin layer is preferably $MV_1>MV_2$.

More specifically, the melt viscosity difference ($MV_1-MV_2$) between the melt viscosity ($MV_1$) of the first resin layer at 140° C. and the melt viscosity ($MV_2$) of the second resin layer at 140° C. is preferably 2,000 dPa·s or more, and more preferably 5,000 dPa·s or more. The upper limit value of the melt viscosity difference ($MV_1-MV_2$) is not particularly limited, and is, for example, 450,000 dPa·s, 400,000 dPa·s, or 300,000 dPa·s.

The melt viscosity of the resin layer at 140° C. can be adjusted by changing the molecular structure, molecular weight, and content of the resin component (polyphenylene ether) or changing the content of the filler component. Specifically, as the filler content in the resin layer is increased, the melt viscosity at 140° C. tends to increase.

The melt viscosity of each of the first resin layer and the second resin layer can be measured by the following method.

Each single resin layer (for example, a dry film including a single resin layer having a thickness of 25 μm) is repeatedly laminated so as to have a thickness of 500 μm using a vacuum laminator MVLP-500 manufactured by MEIKI CO., LTD. to obtain a test piece for melt viscosity measurement. This test piece is charged into a melt viscosity measurement apparatus, and a melt viscosity at 140° C. [unit: dPa·s] is measured.

As a melt viscosity measurement apparatus, a HAAKE rheometer (MARS 40) is used, and the measurement is performed under the conditions of an oscillation temperature raising method (5° C./min), a measurement temperature range: 70 to 200° C., a frequency: 1 Hz, stress control: 2.5 N, parallel plates: a diameter of 20 mm, a gap: 450 μm, and a sample size: 2.5×2.5 cm.

<<<<Young's Modulus>>>>

The first resin layer has a Young's modulus ($YM_1$), as a cured product, of preferably more than 2.0 GPa, more preferably more than 3.0 GPa, still more preferably more than 3.5 GPa, and particularly preferably more than 5.0 GPa.

The second resin layer has a Young's modulus ($YM_2$), as a cured product, of preferably 3.0 GPa or less, more preferably 2.0 GPa or less.

In addition, the relationship between a Young's modulus ($YM_1$) of the cured product of the first resin layer and the Young's modulus ($YM_2$) of the cured product of the second resin layer is preferably $YM_1>YM_2$.

More specifically, the difference in Young's modulus ($YM_1-YM_2$) between the Young's modulus ($YM_1$) of the cured product of the first resin layer and the Young's modulus ($YM_2$) of the cured product of the second resin layer is preferably 0.5 GPa or more, more preferably 1.0 GPa or more, and particularly preferably 1.5 Pa or more. In addition, the upper limit value of the difference in Young's modulus ($YM_1$-$YM_2$) is not particularly limited, but is 8 GPa, 6 GPa, 5 GPa, or the like.

Young's modulus as a cured product of the resin layer can be adjusted by changing the molecular structure, molecular weight, and content of the resin component (polyphenylene ether), changing the number of curing reactive functional groups contained in the composition, and changing the filler content. Specifically, as the filler content in the resin layer is increased, Young's modulus tends to increase.

Young's modulus as a cured product of the resin layer can be measured by the following method.

A cured product of a resin layer having a thickness of 25 μm is cut into a length of 8 cm and a width of 0.5 cm, and Young's modulus is measured under the following conditions.

Young's modulus is determined from the slope of strain when the stress in the obtained stress-strain diagram is from 5 MPa to 10 MPa.

[Measurement Conditions]

Tester: tensile tester EZ-SX (manufactured by Shimadzu Corporation)

Distance between chucks: 50 mm

Test speed: 1 mm/min

Elongation calculation: (tensile movement amount/distance between chucks)×100

<<<<Configuration: Other Layers>>>>

Examples of the other layers include a base film such as polyethylene terephthalate or polypropylene, and a cover film for protecting the surface of the curable resin layer.

<<<<<Components>>>>>

(A1) The polyphenylene ether, (A2) the polyphenylene ether, (B1) the filler, (B2) the filler, (C1) the other components, and (C2) the other components, which are constituent components of the first resin layer and the second resin layer described above, will be described.

<<<<Component: Polyphenylene Ethers (A1) and (A2)>>>>

(A1) The polyphenylene ether contained in the first curable composition and the resin layer and (A2) the polyphenylene ether contained in the second curable composition and the resin layer may be the same component or different components. Herein, (A1) the polyphenylene ether and (A2) the polyphenylene ether will be collectively described as a polyphenylene ether (predetermined polyphenylene ether).

<<<Polyphenylene Ether (Predetermined Polyphenylene Ether)>>>

The polyphenylene ether of the present invention is a polyphenylene ether that is obtained from raw material phenols containing phenols satisfying at least condition 1 and has a branched structure. Such a polyphenylene ether is referred to as a predetermined polyphenylene ether.

(Condition 1)

Having hydrogen atoms at ortho and para positions

The phenols {for example, phenols (A) and phenols (B) described later} satisfying the condition 1 have a hydrogen atom at the ortho position, and thus an ether bond can be formed not only at the ipso position and the para position but also at the ortho position when oxidatively polymerized with the phenols, so that a branched chain structure can be formed.

As described above, the polyphenylene ether having a branched structure may be referred to as a predetermined polyphenylene ether (or branched polyphenylene ether).

As described above, a part of the structure of the predetermined polyphenylene ether is branched by a benzene ring in which at least three positions of an ipso position, an ortho position, and a para position are ether-bonded. The predetermined polyphenylene ether is considered to be, for example, a polyphenylene ether compound having at least a branched structure as represented by formula (i) in the skeleton.

[Chemical Formula 1]

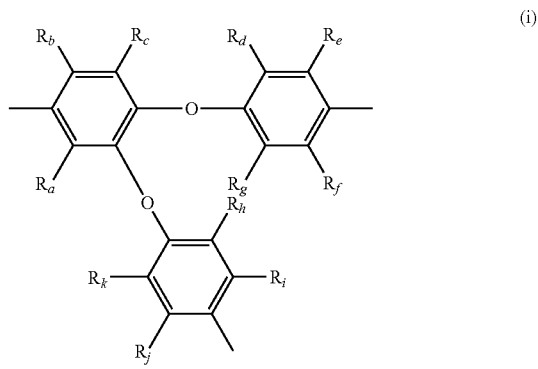

In the formula (i), $R_a$ to $R_k$ each represent a hydrogen atom or a hydrocarbon group having 1 to 15 carbon atoms (preferably, 1 to 12 carbon atoms).

Herein, the raw material phenols composing the predetermined polyphenylene ether may contain other phenols that do not satisfy the condition 1 as long as the effect of the present invention is not impaired.

Examples of such other phenols include phenols (C) and phenols (D) described later, and phenols having no hydrogen atom at the para position. In particular, the phenols (C) and the phenols (D) described later are polymerized in a linear form with formation of an ether bond at the ipso position and the para position during oxidative polymerization. Therefore, to increase the molecular weight of the polyphenylene ether, it is preferable to further contain the phenols (C) and the phenols (D) as raw material phenols.

In addition, the predetermined polyphenylene ether may have a functional group containing an unsaturated carbon bond. Having such a functional group and thus providing the effect of imparting crosslinkability and excellent reactivity further improve various properties of the cured product.

In the present invention, an "unsaturated carbon bond" refers to an ethylenic or acetylenic carbon-carbon multiple bond (double bond or triple bond) unless otherwise specified.

Examples of the functional group containing such an unsaturated carbon bond are not particularly limited, but are preferably an alkenyl group (for example, a vinyl group or an allyl group), an alkynyl group (for example, an ethynyl group), or a (meth)acryloyl group; more preferably a vinyl group, an allyl group, or a (meth)acryloyl group from the viewpoint of excellent curability; and still more preferably an allyl group from the viewpoint of excellent low dielectric properties. These functional groups having an unsaturated carbon bond can have, for example, 15 or less, 10 or less, 8 or less, 5 or less, or 3 or less carbon atoms.

The method for introducing such a functional group containing an unsaturated carbon bond into a predetermined polyphenylene ether is not particularly limited, and examples thereof include the following [Method 1] or [Method 2].

[Method 1]

A method 1 is a method of containing,
as raw material phenols,
phenols (A) satisfying at least both of the following condition 1 and the following condition 2 (embodiment 1), or containing a mixture of phenols (B) satisfying at least the following condition 1 and not satisfying the following condition 2 and phenols (C) not satisfying the following condition 1 and satisfying the following condition 2 (embodiment 2).

(Condition 1)

Having hydrogen atoms at ortho and para positions (Condition 2)

Having a hydrogen atom at the para position, and having a functional group containing an unsaturated carbon bond The method 1 can provide a predetermined polyphenylene ether having a functional group containing an unsaturated carbon bond derived from raw material phenols.

[Method 2]

A method 2 is a method of
modifying a terminal hydroxyl group of the branched polyphenylene ether to a functional group containing an unsaturated carbon bond to obtain a terminal-modified polyphenylene ether.

The method 2 can provide a predetermined polyphenylene ether into which the functional group containing an unsaturated carbon bond is introduced, although the raw material phenols do not have a functional group containing an unsaturated carbon bond.

[Method 1] and [Method 2] may be performed simultaneously.

<<Predetermined Polyphenylene Ether Obtained by Method 1>>

The predetermined polyphenylene ether obtained by the method 1 uses phenols satisfying the condition 2 {for example, any one of phenols (A) and phenols (C)} as at least phenol raw materials, and thus the predetermined polyphenylene ether has crosslinkability by a hydrocarbon group containing at least an unsaturated carbon bond. When the predetermined polyphenylene ether has such a hydrocarbon group containing an unsaturated carbon bond, it is also possible to perform modification such as epoxidation using a compound that reacts with the hydrocarbon group and has a reactive functional group such as an epoxy group.

That is, the predetermined polyphenylene ether obtained by the method 1 is, for example, a polyphenylene ether having at least a branched structure as represented by the formula (i) in the skeleton, and is considered to be a compound having a hydrocarbon group containing at least one unsaturated carbon bond as a functional group. Specifically, it is considered to be a compound in which at least one of $R_a$ to $R_k$ in the formula (i) is a hydrocarbon group having an unsaturated carbon bond.

In particular, in the embodiment 2 described above, the phenols (B) are preferably at least one of o-cresol, 2-phenylphenol, 2-dodecylphenol, and phenol, and the phenols (C) are preferably 2-allyl-6 methylphenol from industrial and economic viewpoints.

Hereinafter, the phenols (A) to (D) will be described in more detail.

As described above, the phenols (A) are phenols satisfying both of the condition 1 and the condition 2, that is, phenols having a hydrogen atom at the ortho and para positions and having a functional group containing an unsaturated carbon bond, and are preferably phenols (a) represented by the following formula (1).

[Chemical Formula 2]

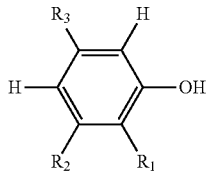

(1)

In the formula (1), $R_1$ to $R_3$ each represent a hydrogen atom or a hydrocarbon group having 1 to 15 carbon atoms. At least one of $R_1$ to $R_3$ is a hydrocarbon group having an unsaturated carbon bond. From the viewpoint of facilitating polymerization during oxidative polymerization, the hydrocarbon group preferably has 1 to 12 carbon atoms.

Examples of the phenols (a) represented by the formula (1) include o-vinylphenol, m-vinylphenol, o-allylphenol, m-allylphenol, 3-vinyl-6-methylphenol, 3-vinyl-6-ethylphenol, 3-vinyl-5-methylphenol, 3-vinyl-5-ethylphenol, 3-allyl-6-methylphenol, 3-allyl-6-ethylphenol, 3-allyl-5-methylphenol, 3-allyl-5-ethylphenol, and the like. As the phenols represented by the formula (1), only one type or two or more types may be used.

As described above, the phenols (B) are phenols that satisfy the condition 1 and do not satisfy the condition 2, that is, phenols having a hydrogen atom at the ortho and para positions and having no functional group containing an unsaturated carbon bond, and are preferably phenols (b) represented by the following formula (2).

[Chemical Formula 3]

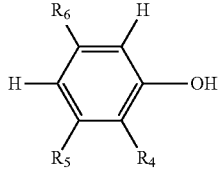

(2)

In the formula (2), $R_4$ to $R_6$ each represent a hydrogen atom or a hydrocarbon group having 1 to 15 carbon atoms. However, $R_4$ to $R_6$ do not have an unsaturated carbon bond. From the viewpoint of facilitating polymerization during oxidative polymerization, the hydrocarbon group preferably has 1 to 12 carbon atoms.

Examples of the phenols (b) represented by the formula (2) include phenol, o-cresol, m-cresol, o-ethylphenol, m-ethylphenol, 2,3-xylenol, 2,5-xylenol, 3,5-xylenol, o-tert-butylphenol, m-tert-butylphenol, o-phenylphenol, m-phenylphenol, 2-dodecylphenol, and the like. As the phenols represented by the formula (2), only one type or two or more types may be used.

As described above, the phenols (C) are phenols that do not satisfy the condition 1 and satisfy the condition 2, that is, phenols having a hydrogen atom at the para position, no hydrogen atom at the ortho position, and having a functional group containing an unsaturated carbon bond, and are preferably phenols (c) represented by the following formula (3).

[Chemical Formula 4]

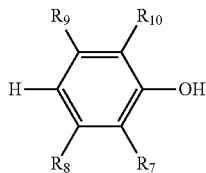

(3)

In the formula (3), $R_7$ and $R_{10}$ are a hydrocarbon group having 1 to 15 carbon atoms, and $R_8$ and $R_9$ are a hydrogen atom or a hydrocarbon group having 1 to 15 carbon atoms. At least one of $R_7$ to $R_{10}$ is a hydrocarbon group having an unsaturated carbon bond. From the viewpoint of facilitating polymerization during oxidative polymerization, the hydrocarbon group preferably has 1 to 12 carbon atoms.

Examples of the phenols (c) represented by the formula (3) include 2-allyl-6-methylphenol, 2-allyl-6-ethylphenol, 2-allyl-6-phenylphenol, 2-allyl-6-styrylphenol, 2,6-divinylphenol, 2,6-diallylphenol, 2,6-diisopropenylphenol, 2,6-dibutenylphenol, 2,6-diisobutenylphenol, 2,6-diisopentenylphenol, 2-methyl-6-styrylphenol, 2-vinyl-6-methylphenol, 2-vinyl-6-ethylphenol, and the like. As the phenols represented by the formula (3), only one type or two or more types may be used.

As described above, the phenols (D) are phenols having a hydrogen atom at the para position, no hydrogen atom at the ortho position, and no functional group containing an unsaturated carbon bond, and are preferably phenols (d) represented by the following formula (4).

[Chemical Formula 5]

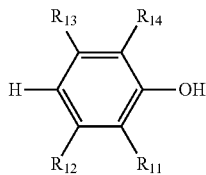

(4)

In the formula (4), $R_{11}$ and $R_{14}$ each represent a hydrocarbon group having 1 to 15 carbon atoms and no unsaturated carbon bond, and $R_{12}$ and $R_{13}$ each represent a hydrogen atom or a hydrocarbon group having 1 to 15 carbon atoms and no unsaturated carbon bond. From the viewpoint of facilitating polymerization during oxidative polymerization, the hydrocarbon group preferably has 1 to 12 carbon atoms.

Examples of the phenols (d) represented by the formula (4) include 2,6-dimethylphenol, 2,3,6-trimethylphenol, 2-methyl-6-ethylphenol, 2-ethyl-6-n-propylphenol, 2-methyl-6-n-butylphenol, 2-methyl-6-phenylphenol, 2,6-diphenylphenol, 2,6-ditolylphenol, and the like. As the phenols represented by the formula (4), only one type or two or more types may be used.

Herein, in the present invention, examples of the hydrocarbon group include an alkyl group, a cycloalkyl group, an aryl group, an alkenyl group, an alkynyl group, and the like, and the alkyl group, the aryl group, and the alkenyl group are preferable. Examples of the hydrocarbon group having an unsaturated carbon bond include an alkenyl group, an alkynyl group, and the like. These hydrocarbon groups may be linear or branched.

<<Predetermined Polyphenylene Ether Obtained by Method 2>>

A predetermined polyphenylene ether obtained by the method 2 is a terminal-modified branched polyphenylene ether.

Such a terminal-modified branched polyphenylene ether has a branched structure and a terminal hydroxyl group is modified, whereby a cured product that is soluble in various solvents and further has low dielectric properties can be provided. In addition, in the terminal-modified branched polyphenylene ether, as a result of disposing an unsaturated carbon bond at a terminal position, reactivity is extremely improved, and the performances of the resulting cured product are further improved.

When the terminal hydroxyl group is modified with a modifying compound, an ether bond or an ester bond is typically formed between the terminal hydroxyl group and the modifying compound.

Herein, the modifying compound is not particularly limited as long as it contains a functional group having an unsaturated carbon bond and can react with a phenolic hydroxyl group in the presence or absence of a catalyst.

Preferable examples of the modifying compound include an organic compound represented by the following formula (11).

[Chemical Formula 6]

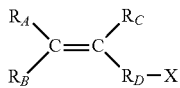

(11)

In the formula (11), $R_A$, $R_B$, and $R_C$ each independently represent hydrogen or a hydrocarbon group having 1 to 9 carbon atoms, $R_D$ represents a hydrocarbon group having 1 to 9 carbon atoms, and X represents a group capable of reacting with a phenolic hydroxyl group such as F, Cl, Br, I, or CN.

In addition, from another viewpoint, preferable examples of the modifying compound include an organic compound represented by the following formula (11-1).

[Chemical Formula 7]

R—X    (11-1)

In the formula (11-1), R represents a vinyl group, an allyl group, or a (meth)acryloyl group, and X represents a group capable of reacting with a phenolic hydroxyl group such as F, Cl, Br, and I.

Modification of the terminal hydroxyl group of the branched polyphenylene ether can be confirmed by comparing the hydroxyl values of the branched polyphenylene ether and the terminal-modified branched polyphenylene ether. A part of the terminal-modified branched polyphenylene ether may remain unmodified hydroxyl groups.

The reaction temperature, the reaction time, the presence or absence of the catalyst, the type of the catalyst, and the like during modification can be appropriately designed. Two or more compounds may be used as the modifying compound.

When the predetermined polyphenylene ether as described above is used as a component of the curable composition, it may be used singly, or may be used in combination of two or more.

The ratio of the phenols satisfying the condition 1 to the total of the raw material phenols used in the synthesis of the predetermined polyphenylene ether is preferably 1 to 50 mol %.

In addition, the phenols satisfying the above condition 2 may not be used, but when used, the ratio of the phenols satisfying the condition 2 to the total of the raw material phenols is preferably 0.5 to 99 mol %, and more preferably 1 to 99 mol %.

<<Physical Properties and Properties of Predetermined Polyphenylene Ether>>
<Degree of Branching>

The branched structure (degree of branching) of the predetermined polyphenylene ether can be confirmed based on the following analysis procedure.

(Analysis Procedure)

Chloroform solutions of polyphenylene ethers are prepared at intervals of 0.1, 0.15, 0.2, and 0.25 mg/mL, then a graph of the refractive index difference and the concentration is created while delivering the solution at 0.5 m/min, and the refractive index increment dn/dc is calculated from the slope. Then, the absolute molecular weight is measured under the following apparatus operating conditions. With reference to the chromatogram of the RI detector and the chromatogram of the MALS detector, a regression line by the least squares method is obtained from a logarithmic graph of the molecular weight and the rotation radius (conformation plot), and the slope thereof is calculated.

(Measurement Conditions)

Apparatus name: HLC8320GPC
  Mobile phase: chloroform
  Column: TOSOH TSKguardcolumnHHR-H
  +TSKgelGMHHR-H (2 pieces)
  +TSKgelG2500HHR
  Flow rate: 0.6 mL/min
  Detector: DAWN HELEOS (MALS detector)
  +Optilab rEX (RI detector, wavelength 254 nm)
  Sample concentration: 0.5 mg/mL
  Sample solvent: same as the mobile phase. Dissolve 5 mg of a sample in 10 mL of a mobile phase
  Injection amount: 200 μL
  Filter: 0.45 μm
  STD reagent: standard polystyrene Mw 37,900
  STD concentration: 1.5 mg/mL
  STD solvent: same as the mobile phase. Dissolve 15 mg of a sample in 10 mL of a mobile phase
  Analysis time: 100 min In the resin having the same absolute molecular weight, the distance (rotation radius) from the center of gravity to each segment decreases as the branching of the polymer chain progresses. Therefore, the slope of the logarithmic plot of the absolute molecular weight and the rotation radius obtained by GPC-MALS indicates the degree of branching, and the smaller slope means more progressive branching. In the present invention, the smaller slope calculated from the above conformation plot means more blanching of the polyphenylene ether, and the larger slope indicates less blanching of the polyphenylene ether.

In the predetermined polyphenylene ether composing the curable composition of the present invention, the above slope is less than 0.6, and is preferably 0.55 or less, 0.50 or less, 0.45 or less, 0.40 or less, or 0.35 or less. When the above slope is in such a range, it is considered that the polyphenylene ether has sufficient branching. The lower limit of the above slope is not particularly limited, but is, for example, 0.05 or more, 0.10 or more, 0.15 or more, or 0.20 or more.

The slope of the conformation plot can be adjusted by changing the temperature, the catalyst amount, the stirring rate, the reaction time, the oxygen feed amount, and the solvent amount in the synthesis of the polyphenylene ether. More specifically, increasing the temperature, increasing the catalyst amount, increasing the stirring rate, increasing the reaction time, increasing the oxygen feed amount, and/or decreasing the solvent amount tends to decrease the slope of the conformation plot (the polyphenylene ether branches more easily).

<Molecular Weight of Predetermined Polyphenylene Ether>

The predetermined polyphenylene ether composing the curable composition of the present invention preferably has a number average molecular weight of 2,000 to 30,000, more preferably 5,000 to 30,000, still more preferably 8,000 to 30,000, and particularly preferably 8,000 to 25,000. The molecular weight is set to be in such a range, allowing to improve the film-forming properties of the curable composition while maintaining solubility in a solvent. Further, the predetermined polyphenylene ether composing the curable composition of the present invention preferably has a polydispersity index (PDI: weight average molecular weight/number average molecular weight) of 1.5 to 20.

In the present invention, the number average molecular weight and the weight average molecular weight are values obtained by measuring with gel permeation chromatography (GPC) followed by conversion with a calibration curve prepared using standard polystyrene.

<Hydroxyl Value of Predetermined Polyphenylene Ether>

The hydroxyl value of the predetermined polyphenylene ether composing the curable composition of the present invention is preferably 15 or less, more preferably 2 or more and 10 or less, and still more preferably 3 or more and 8 or less when the number average molecular weight (Mn) is in the range of 2,000 to 30,000.

When the predetermined polyphenylene ether is a predetermined polyphenylene ether obtained by the method 2, for example, the hydroxyl value may be lower than the above value.

<Solvent Solubility of Predetermined Polyphenylene Ether>

1 g of the predetermined polyphenylene ether composing the curable composition of the present invention is preferably soluble in 100 g of cyclohexanone (more preferably, 100 g of cyclohexanone, DMF, and PMA) at 25° C. Solubility of 1 g of polyphenylene ether in 100 g of a solvent (for example, cyclohexanone) means that when 1 g of polyphenylene ether and 100 g of a solvent are mixed, turbidity and precipitation cannot be visually confirmed. An amount of 1 g or more of the predetermined polyphenylene ether is more preferably soluble in 100 g of cyclohexanone at 25° C.

The predetermined polyphenylene ether composing the curable composition of the present invention has a branched structure, thereby improving solubility in various solvents and dispersibility and compatibility between components in the composition. Therefore, each component of the composition is uniformly dissolved or dispersed, and a uniform cured product can be obtained. As a result, the cured product is extremely excellent in mechanical properties and the like. In particular, the predetermined polyphenylene ethers can be crosslinked with each other. As a result, the obtained cured product has better mechanical properties, low thermal expansion, and the like.

<<Method for Producing Predetermined Polyphenylene Ether>>

The predetermined polyphenylene ether composing the curable composition of the present invention can be produced by applying a conventionally known method for synthesizing a polyphenylene ether (polymerization conditions, presence or absence of catalyst, type of catalyst, and the like) except that specific raw material phenols are used.

Next, an example of a method for producing the predetermined polyphenylene ether will be described.

The predetermined polyphenylene ether can be produced by, for example, preparing a polymerization solution containing specific phenols, a catalyst, and a solvent (polymerization solution preparation step), passing oxygen through at least the solvent (oxygen feed step), and oxidatively polymerizing phenols in the polymerization solution containing oxygen (polymerization step).

Hereinafter, the polymerization solution preparation step, the oxygen feed step, and the polymerization step will be described. Each step may be continuously performed, a part or all of a certain step and a part or all of another step may be simultaneously performed, or a certain step may be interrupted and another step may be performed during the certain step. For example, the oxygen feed step may be performed during the polymerization solution preparation step or the polymerization step. In addition, the method for producing a polyphenylene ether of the present invention may include other steps as necessary. Examples of the other steps include a step of extracting the polyphenylene ether obtained in the polymerization step (for example, a step of performing reprecipitation, filtration, and drying), and the above-described modification step.

<Polymerization Solution Preparation Step>

The polymerization solution preparation step is a step of mixing raw materials containing phenols to be polymerized in the polymerization step described later to prepare a polymerization solution. Examples of the raw materials of the polymerization solution include raw material phenols, catalysts, and solvents.

(Catalyst)

The catalyst is not particularly limited, and may be an appropriate catalyst used in the oxidative polymerization of the polyphenylene ether.

Examples of the catalyst include an amine compound, and a metal amine compound composed of a heavy metal compound such as copper, manganese, or cobalt and an amine compound such as tetramethylethylenediamine. In particular, in order to obtain a copolymer having a sufficient molecular weight, it is preferable to use a copper-amine compound in which a copper compound is coordinated to an amine compound. The catalyst may be used singly, or may be used in combination of two or more.

The content of the catalyst is not particularly limited, but may be 0.1 to 0.6 mol % or the like relative to the total amount of the raw material phenols in the polymerization solution.

Such a catalyst may be previously dissolved in an appropriate solvent.

(Solvent)

The solvent is not particularly limited, and may be an appropriate solvent used in the oxidative polymerization of the polyphenylene ether. As the solvent, a solvent capable of dissolving or dispersing the phenolic compound and the catalyst is preferably used.

Specific examples of the solvent include aromatic hydrocarbons such as benzene, toluene, xylene, and ethylbenzene; halogenated aromatic hydrocarbons such as chloroform, methylene chloride, chlorobenzene, dichlorobenzene, and trichlorobenzene; nitro compounds such as nitrobenzene; methyl ethyl ketone (MEK), cyclohexanone, tetrahydrofuran, ethyl acetate, N-methyl-2-pyrrolidone (NMP), N,N-dimethylformamide (DMF), propylene glycol monomethyl ether acetate (PMA), and diethylene glycol monoethyl ether acetate (CA). The solvent may be used singly, or may be used in combination of two or more.

The solvent may include water, a solvent compatible with water, or the like.

The content of the solvent in the polymerization solution is not particularly limited, and may be appropriately adjusted.

(Other Raw Materials)

The polymerization solution may contain other raw materials as long as the effect of the present invention is not impaired.

<Oxygen Feed Step>

The oxygen feed step is a step of aerating an oxygen-containing gas into the polymerization solution.

The ventilation time of the oxygen gas and the oxygen concentration in the oxygen-containing gas to be used can be appropriately changed according to the atmospheric pressure, the temperature, and the like.

<Polymerization Step>

The polymerization step is a step of oxidatively polymerizing phenols in the polymerization solution under a situation where oxygen is fed into the polymerization solution.

Specific polymerization conditions are not particularly limited, but for example, stirring may be performed under conditions of 25 to 100° C. and 2 to 24 hours.

In the production of the predetermined polyphenylene ether through the steps as described above, a specific method for introducing a functional group containing an unsaturated carbon bond into a branched polyphenylene ether can be understood with reference to the method 1 and the method 2 described above. That is, the predetermined polyphenylene ether having a functional group containing an unsaturated carbon bond can be obtained by specifying the type of the raw material phenols or further providing a step (modification step) of modifying the terminal hydroxyl group after the polymerization step.

<<<<Component: Filler (B1) and (B2)>>>>

(B1) The filler contained in the first curable composition and the resin layer of the present invention and (B2) the filler contained in the second curable composition and the resin layer may have the same component or different components. Herein, (B1) the filler and (B2) the filler will be collectively described as filler.

Examples of the filler include inorganic fillers and organic fillers.

Examples of the inorganic filler include metal oxides such as silica, alumina, and titanium oxide; metal hydroxides such as aluminum hydroxide and magnesium hydroxide; clay minerals such as talc and mica; fillers having a perovskite-type crystal structure such as barium titanate and strontium titanate; boron nitride, aluminum borate, barium sulfate, and calcium carbonate.

Examples of the organic filler include fluororesin fillers such as polytetrafluoroethylene (PTFE), a tetrafluoroethylene-ethylene copolymer (ETFE), a tetrafluoroethylene-perfluoroalkyl vinyl ether copolymer (PFA), a tetrafluoroethylene-hexafluoropropylene copolymer (FEP), polychlorotrifluoroethylene (PCTFE), polyvinylidene fluoride (PVDF), and polyvinyl fluoride (PVF); hydrocarbon-based resin fillers such as cycloolefin polymer (COP) and cycloolefin copolymer (COC).

Of these, the filler component is preferably silica in consideration of low dielectric loss tangent and low thermal expansion. Hereinafter, silica that is a preferable form of the filler component will be described.

<<Silica>>

The average particle size of silica is preferably 0.01 to 10 μm, and more preferably 0.1 to 3 μm. Herein, the average particle size can be determined as a median diameter (d50, based on volume) by a cumulative distribution from a measured value of a particle size distribution by a laser diffraction/scattering method using a commercially available laser diffraction/scattering type particle size distribution measurement apparatus.

Silicas having different average particle sizes can also be used in combination. In a case where it is desired to highly fill the silica, for example, minute silica of nano-order having an average particle size that is less than 1 μm may be used in combination with silica having an average particle size of 1 μm or more.

The silica may be surface-treated with a coupling agent. Treating the surface with a silane coupling agent can improve dispersibility with the polyphenylene ether. In addition, the affinity with an organic solvent can be improved.

As the silane coupling agent, for example, an epoxysilane coupling agent, a mercaptosilane coupling agent, a vinylsilane coupling agent, or the like can be used. As the epoxysilane coupling agent, for example, γ-glycidoxypropyltrimethoxysilane, γ-glycidoxypropylmethyldimethoxysilane, or the like can be used. As the mercaptosilane coupling agent, for example, γ-mercaptopropyltriethoxysilane or the like can be used. As the vinylsilane coupling agent, for example, vinyltriethoxysilane or the like can be used.

The amount of the silane coupling agent used may be, for example, 0.1 to 5 parts by mass or 0.5 to 3 parts by mass relative to 100 parts by mass of silica.

<<<<Component: Other Components (C1) and (C2)>>>>>

The first curable composition and the resin layer may contain (C1) other components, and the second curable composition and the resin layer may contain (C2) other components. (C1) The other components and (C2) the other components may be the same component or different components. Herein, (C1) the other components and (C2) the other components will be collectively described as other components.

Examples of the other components include conventionally known additives that can be blended in the first curable composition and the second curable composition. More specifically, it is preferable to contain a peroxide, a crosslinking curing agent, an elastomer, a maleimide compound, and the like.

In addition, the other components may include components such as a flame retardant improver (a phosphorus-based compound or the like), a cellulose nanofiber, a polymer component (resin components such as cyanate ester resin, epoxy resin, and phenol novolac resin, and organic polymers such as unbranched polyphenylene ether, polyimide, and polyamide), a dispersant, a thermosetting catalyst, a thickener, an antifoaming agent, an antioxidant, a rust inhibitor, and an adhesion imparting agent, as long as the effect of the present invention is not impaired.

These may be used singly, or may be used in combination of two or more.

<<<Peroxide>>>

When the predetermined polyphenylene ether has an unsaturated carbon bond, the curable composition or the curable resin laminate preferably contains a peroxide.

Examples of the peroxide include: methyl ethyl ketone peroxide, methyl acetoacetate peroxide, acetylacetoperoxide, 1,1-bis(t-butylperoxy)cyclohexane, 2,2-bis(t-butylperoxy)butane, t-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, di-t-butyl hydroperoxide, t-butyl hydroperoxide, dicumyl peroxide, 2,5-dimethyl-2,5-di(t-butylperoxy)hexane, 2,5-dimethyl-2,5-di(t-butylperoxy)hexyne, 2,5-dimethyl-2,5-di(t-butylperoxy)-3-butene, acetyl peroxide, octanoyl peroxide, lauroyl peroxide, benzoyl peroxide, m-toluyl peroxide, diisopropylperoxydicarbonate, t-butylene peroxybenzoate, di-t-butyl peroxide, t-butylperoxyisopropyl monocarbonate, and α,α'-bis(t-butylperoxy-m-isopropyl)benzene. The peroxide may be used singly, or may be used in combination of two or more.

Of these, the peroxide having a 1-minute half-life temperature of 130° C. to 180° C. is desirable from the viewpoint of ease of handling and reactivity. Such a peroxide has a relatively high reaction starting temperature, and thus it is difficult to accelerate curing at the time when curing is not required, such as during drying, and the storability of the curable composition containing the polyphenylene ether is not deteriorated. In addition, the peroxide has low volatility, and thus does not volatilize during drying or storage, and has good stability.

The content of the peroxide in the curable composition or the curable resin laminate is preferably 0.01 to 20% by mass, more preferably 0.05 to 10% by mass, and particularly preferably 0.1 to 10% by mass relative to the total solid content of the curable composition or the curable resin laminate in terms of the total amount of the peroxide. Setting the total amount of the peroxide within this range can prevent deterioration of the film quality when a coating film is formed while making the effect at low temperature sufficient.

As necessary, an azo compound such as azobisisobutyronitrile or azobisisovaleronitrile or a radical initiator such as dicumyl or 2,3-diphenylbutane may be contained.

<<<Crosslinking Curing Agent>>>

When the predetermined polyphenylene ether has an unsaturated carbon bond, the curable composition or the curable resin laminate preferably contains a crosslinking curing agent.

As the crosslinking curing agent, those having good compatibility with polyphenylene ether are used, but there are preferable polyfunctional vinyl compounds such as divinylbenzene, divinylnaphthalene, and divinylbiphenyl; vinyl benzyl ether-based compounds synthesized from reaction of phenol and vinyl benzyl chloride; allyl ether-based compounds synthesized from reaction of styrene monomer, phenol, and allyl chloride; and trialkenyl isocyanurate. As the crosslinking curing agent, trialkenyl isocyanurate having particularly good compatibility with the polyphenylene ether is preferable, and particularly, triallyl isocyanurate (TAIC (registered trademark)) and triallyl cyanurate (hereinafter, TAC) are preferable. These materials exhibit low dielectric properties and can enhance heat resistance. TAIC (registered trademark) is particularly preferable because of being excellent in compatibility with polyphenylene ether.

In addition, as the crosslinking curing agent, a (meth) acrylate compound (a methacrylate compound and an acrylate compound) may be used. In particular, it is preferable to use a 3 to 5 functional (meth)acrylate compound. As the 3 to 5 functional methacrylate compound, trimethylolpropane trimethacrylate or the like can be used, whereas as the 3 to 5 functional acrylate compound, trimethylolpropane triacrylate or the like can be used. Using these crosslinking curing agents can enhance heat resistance. The crosslinking curing agent may be used singly, or may be used in combination of two or more.

When the component in the curable composition or curable resin laminate containing a predetermined polyphenylene ether contains a hydrocarbon group having an unsaturated carbon bond, a cured product having excellent dielectric properties can be obtained particularly by curing the curable composition or curable resin laminate with a crosslinking curing agent.

In the curable composition or the curable resin laminate, the blending ratio of the predetermined polyphenylene ether and the crosslinking curing agent (for example, trialkenyl isocyanurate) is preferably 20:80 to 90:10, and more preferably 30:70 to 90:10 in terms of a solid content ratio (predetermined polyphenylene ether:crosslinking curing agent). Within such a range, a cured product excellent in low dielectric properties and heat resistance is obtained.

<<<Maleimide Compound>>>

The maleimide compound is not particularly limited as long as it contains at least one maleimide group in one molecule.

Examples of the maleimide compound include:
(1) monofunctional aliphatic/alicyclic maleimide;
(2) monofunctional aromatic maleimide;
(3) polyfunctional aliphatic/alicyclic maleimide; and
(4) polyfunctional aromatic maleimide.

<<(1) Monofunctional Aliphatic/Alicyclic Maleimide>>

Examples of the monofunctional aliphatic/alicyclic maleimide (1) include N-methylmaleimide, N-ethylmaleimide, and a reaction product of maleimide carboxylic acid and tetrahydrofurfuryl alcohol disclosed in JP 11-302278 A.

<<(2) Monofunctional Aromatic Maleimide>>

Examples of the monofunctional aromatic maleimide (2) include N-phenylmaleimide and N-(2-methylphenyl)maleimide.

<<(3) Polyfunctional Aliphatic/Alicyclic Maleimide>>

Examples of the polyfunctional aliphatic/alicyclic maleimides (3) include: N,N'-methylenebismaleimide; N,N'-ethylenebismaleimide; isocyanurate skeleton maleimide ester compounds obtained by dehydration esterification of tris(hydroxyethyl)isocyanurate and aliphatic/alicyclic maleimide carboxylic acid; isocyanuric skeleton polymaleimides such as isocyanurate skeleton maleimide urethane compounds obtained by urethanization reaction of tris(carbamatehexyl)isocyanurate and an aliphatic/alicyclic maleimide alcohol; isophorone bisurethane bis(N-ethylmaleimide); triethylene glycol bis(maleimidoethyl carbonate); aliphatic/alicyclic polymaleimide ester compounds obtained by dehydration esterification of aliphatic/alicyclic maleimide carboxylic acids and various aliphatic/alicyclic polyols, or transesterification reaction of aliphatic/alicyclic maleimide carboxylic acid esters and various aliphatic/alicyclic polyols; aliphatic/alicyclic polymaleimide ester compounds obtained by an ether ring-opening reaction of an aliphatic/alicyclic maleimide carboxylic acid and various aliphatic/alicyclic polyepoxides; aliphatic/alicyclic polymaleimide urethane compounds obtained by urethanization reaction of aliphatic/alicyclic maleimide alcohols and various aliphatic/alicyclic polyisocyanates; and the like.

Specific examples thereof include aliphatic bismaleimide compounds represented by the following general formulas (X1) and (X2) obtained by dehydration esterification reaction or transesterification reaction of a maleimidoalkylcarboxylic acid or a maleimidoalkylcarboxylic acid ester having an alkyl group having 1 to 6 carbon atoms, more preferably a linear alkyl group; and polyethylene glycol with a number average molecular weight of 100 to 1000 and/or polypropylene glycol with a number average molecular weight of 100 to 1000 and/or polytetramethylene glycol with a number average molecular weight of 100 to 1000.

[Chemical Formula 8]

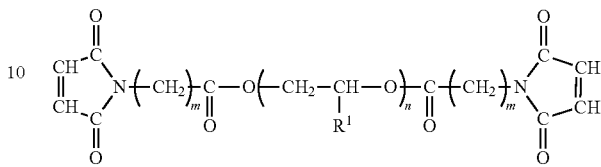

(X1)

(In the formula, m represents an integer of 1 to 6 n represents a value of 2 to 23, and $R_1$ represents a hydrogen atom or a methyl group.)

[Chemical Formula 9]

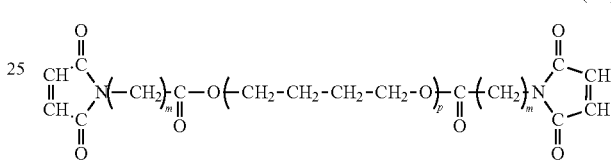

(X2)

(In the formula, m represents an integer of 1 to 6, and p represents a value of 2 to 14.)

<<(4) Polyfunctional Aromatic Maleimide>>

Examples of the polyfunctional aromatic maleimide (4) include: N,N'-(4,4'-diphenylmethane)bismaleimide; bis-(3-ethyl-5-methyl-4-maleimidophenyl)methane; 2,2'-bis-(4-(4-maleimidophenoxy)propane, N,N'-(4,4'-diphenyloxy)bismaleimide; N,N'-p-phenylenebismaleimide; N,N'-m-phenylenebismaleimide; N,N'-2,4-tolylenebismaleimide; N,N'-2,6-tolylenebismaleimide; aromatic polymaleimide ester compounds obtained by dehydration esterification of maleimide carboxylic acid and various aromatic polyols, or transesterification reaction of maleimide carboxylic acid ester and various aromatic polyols; aromatic polymaleimide ester compounds obtained by an ether ring-opening reaction of maleimide carboxylic acid and various aromatic polyepoxides; aromatic polymaleimide urethane compounds obtained by urethanization reaction of maleimide alcohol and various aromatic polyisocyanates; and the like.

Of these, the maleimide compound is preferably polyfunctional. The maleimide compound preferably has a bismaleimide skeleton. The maleimide compound can be used singly, or can be used in combination of two or more.

The weight average molecular weight of the maleimide compound is not particularly limited, but can be set to 100 or more, 200 or more, 500 or more, 750 or more, 1,000 or more, 2,000 or more, or 100,000 or less, 50,000 or less, 10,000 or less, 5,000 or less, 4,000 or less, or 3,500 or less.

The content of the maleimide compound can be typically 0.5 to 50% by mass, 1 to 40% by mass, or 1.5 to 30% by mass based on the total solid content in the curable composition or the curable resin laminate.

In addition, from another viewpoint, in the curable composition or the curable resin laminate, the blending ratio of the predetermined polyphenylene ether and the maleimide compound can be set to 9:91 to 99:1, 17:83 to 95:5, or 25:75 to 90:10 as a solid content ratio.

When the curable composition or the curable resin laminate contains a maleimide compound and a crosslinking curing agent, the blending ratio of the maleimide compound and the crosslinking curing agent is preferably 80:20 to 10:90, and more preferably 70:30 to 20:80 as a solid content ratio (maleimide compound:crosslinking curing agent). Within such a range, a cured product excellent in low dielectric properties and heat resistance is obtained.

<<<Elastomer>>>

Examples of the elastomer include: diene-based synthetic rubbers such as polyisoprene rubber, polybutadiene rubber, styrene-butadiene rubber, polychloroprene rubber, nitrile rubber, and ethylene-propylene rubber; non-diene-based synthetic rubbers such as ethylene-propylene rubber, butyl rubber, acrylic rubber, polyurethane rubber, fluororubber, silicone rubber, and epichlorohydrin rubber; natural rubber; styrene elastomer; olefin elastomer; urethane elastomer; polyester elastomer; polyamide elastomer; acrylic elastomer; silicone elastomer; and the like.

From the viewpoint of compatibility with the polyphenylene ether and dielectric properties, at least a part of the elastomer is preferably a styrene-based elastomer. Examples of the styrene-based elastomer include: styrene-butadiene copolymers such as styrene-butadiene-styrene block copolymers and styrene-butadiene-butylene-styrene block copolymers; styrene-isoprene copolymers such as styrene-isoprene-styrene block copolymers; styrene-ethylene-butylene-styrene block copolymers; styrene-ethylene-propylene-styrene block copolymers; and the like. A styrene-based elastomer having no unsaturated carbon bond, such as a styrene-ethylene-butylene-styrene block copolymer, is preferable because the obtained cured product has particularly good dielectric properties.

The content ratio of the styrene block in the styrene elastomer is preferably 10 to 70% by mass, 30 to 60% by mass, or 40 to 50% by mass. The content ratio of the styrene block can be determined from the integral ratio of the spectrum measured by $^1$H-NMR.

Herein, the raw material monomers of the styrene elastomer include not only styrene but also styrene derivatives such as α-methylstyrene, 3-methylstyrene, 4-propylstyrene, and 4-cyclohexylstyrene.

The content ratio of the styrene-based elastomer in 100% by mass of the elastomer may be, for example, 10% by mass or more, 20% by mass or more, 30% by mass or more, 40% by mass or more, 50% by mass or more, 60% by mass or more, 70% by mass or more, 80% by mass or more, 90% by mass or more, 95% by mass or more, or 100% by mass.

The elastomer may have a functional group (including a bond) that reacts with other components.

For example, the elastomer may have an unsaturated carbon bond as the reactive functional group. By configuring the elastomer in this way, it is possible to crosslink with the unsaturated carbon bond (for example, the unsaturated carbon bond of the branched polyphenylene ether), and there is an effect such as reducing the risk of bleeding out.

The elastomer may be modified using (meth)acrylic acid, maleic acid, an anhydride or an ester thereof. In addition, it may be obtained by further adding water to the residual unsaturated bond of the diene-based elastomer.

The number average molecular weight of the elastomer may be 1,000 to 150,000. When the number average molecular weight is the lower limit value or more, excellent low thermal expansion is obtained, and when the number average molecular weight is the upper limit value or less, excellent compatibility with other components is obtained.

The content of the elastomer may be 10 to 300 parts by mass relative to 100 parts by mass of the predetermined polyphenylene ether in the curable composition or the curable resin laminate. Alternatively, the content of the elastomer may be 3 to 65% by mass based on the total solid content in the curable composition or the curable resin laminate. Within the above range, good tensile properties, adhesion, and heat resistance can be achieved in a well-balanced manner.

<<<<<<Effect of Curable Resin Laminate>>>>>>

When the curable resin laminate of the present invention is used, the second resin layer is disposed on an adherend (copper foil or the like) so that the second resin layer and the adherend (copper foil or the like) are in contact with each other, and thermal pressure bonding is performed to fill the uneven portion of the adherend (copper foil or the like) with the second resin layer without any gap, and then the curable resin laminate is cured to cause a crosslinking reaction at the first resin layer, the second resin layer, and the interface between the resin layers, so that the adherend and the curable resin laminate firmly adhere to each other, whereby excellent peel strength is obtained.

<<<<<<Method for Producing Curable Resin Laminate>>>>>>

<<<<<Raw materials>>>>>

The curable resin laminate can be obtained by diluting the first curable composition and the second curable composition described above with a solvent or the like as necessary to form a solution, applying the solution onto a base film or a substrate, and drying the solution.

The content of the solvent used for diluting the curable composition is not particularly limited, and can be appropriately adjusted according to the application of the curable composition and the desired viscosity.

Solvent

Examples of the solvent that can be used in the curable composition of the present invention include solvents having relatively high safety, such as N-methyl-2-pyrrolidone (NMP), tetrahydrofuran (THF), cyclohexanone, propylene glycol monomethyl ether acetate (PMA), diethylene glycol monoethyl ether acetate (CA), methyl ethyl ketone, and ethyl acetate, in addition to conventionally usable solvents such as chloroform, methylene chloride, and toluene. The solvent may be N,N-dimethylformamide (DMF). The solvent may be used singly, or may be used in combination of two or more.

<<<<<Production Step>>>>>

Hereinafter, an example of a step of producing the curable resin laminate will be described.

<<<<Dry Film>>>>

The dry film of the present invention is characterized in that at least one surface of the curable resin laminate is supported or protected by a film.

The film (base film) serving as a support is not particularly limited, and may be metal foil such as copper foil, and a film such as a polyimide film, a polyester film, and a polyethylene naphthalate (PEN) film. These films can also be used as a support of a dry film or a cover film.

In the method for producing a dry film, for example, a second resin layer is formed by applying a solution of a second curable composition onto a base film using an applicator or the like and drying the solution, and then a first resin layer is formed by applying a solution of a first curable composition onto the second resin layer and drying the solution, whereby a dry film having a two-layer curable resin laminate in which the second resin layer and the first resin layer are sequentially laminated on the base film can be formed.

In addition, by further forming a second resin layer on the first resin layer of the two-layer curable resin laminate, a dry film having a three-layer curable resin structure having a second resin layer on both surfaces of the first resin layer can be formed.

After the resin layer is formed, a step of providing another layer (for example, a cover film) may be performed as necessary.

As the dry film having the curable resin laminate, instead of the step of sequentially laminating the resin layer on the base film described above, a first dry film having a first resin layer and/or a second dry film having a second resin layer are previously prepared, and these dry films are bonded to each other, and further, the base film is peeled off and bonded to each other, whereby a dry film having a structure in which the two-layer curable resin laminate or the three-layer curable resin laminate is sandwiched between the base films can be produced.

The application and drying of the curable composition can be performed by known methods and conditions. For example, a curable composition having a uniform thickness is obtained by a known application method such as a comma coater, a blade coater, a lip coater, a rod coater, a squeeze coater, a reverse coater, a transfer roll coater, a gravure coater, or a spray coater.

Thereafter, the coating film of the curable composition obtained by application is heated and dried at a temperature of 60 to 130° C. for 1 to 30 minutes, whereby a resin layer including a dry coating film can be formed. The heating and drying can be performed by a known heating means such as a hot air circulating drying furnace, an IR furnace, a hot plate, or a convection oven.

The thickness of the resin layer can be adjusted by changing the application conditions and the viscosity of the curable composition.

<<<<<<<Method for Using Curable Resin Laminate and Application Thereof>>>>>>

As an example, the curable resin laminate of the present invention is formed on an appropriate substrate such that the second resin layer is on the surface layer side, and then a conductor layer (copper foil or the like) is pressure-bonded to the second resin layer. As a method for the formation on a substrate, the formation may be performed by applying and drying the first curable composition and the second curable composition on the substrate, or may be performed using a form of the above-described dry film.

As the substrate, in addition to a printed wiring board or a flexible printed wiring board on which a circuit is previously formed, copper-clad laminates of all grades (such as FR-4) using composite materials such as a paper-phenol resin, a paper-epoxy resin, a glass cloth-epoxy resin, a glass-polyimide, a glass cloth/nonwoven fabric-epoxy resin, a glass cloth/paper-epoxy resin, a synthetic fiber-epoxy resin, and a fluororesin, polyethylene, PPO, and cyanate ester; a polyimide film; a PET film; a glass substrate; a ceramic substrate; and a wafer plate can be used.

In the case of forming on a substrate by applying and drying on the substrate, for example, a solution of a first curable composition is applied and dried on the substrate to form a first resin layer, and then a solution of a second curable composition is applied and dried on the first resin layer to form a second resin layer, whereby a curable resin laminate in which the first resin layer and the second resin layer are laminated in this order on the substrate can be formed.

The applying and drying on the substrate can be performed by a known method and condition, and the same applying and drying method as the method for producing a dry film described above can be used.

In the case of being formed on a substrate using the form of the dry film, for example, in the case of a dry film having a two-layer curable resin laminate sandwiched between base films, the base film in contact with the first resin layer is peeled off, and then is disposed so that the first resin layer is in contact with the substrate. Subsequently, the dry film is laminated on the substrate by heating and pressurizing from the base film side in contact with the second resin layer using a vacuum laminator or the like, and the base film on the surface layer is peeled off after cooling to normal temperature, whereby a curable resin laminate in which the first resin layer and the second resin layer are laminated in this order on the substrate can be formed.

The lamination of the dry film on the substrate can be performed by known methods and conditions. Of these, because voids and the like are not generated, it is preferable to use a vacuum laminator, and lamination can be performed under a temperature condition of 80 to 160° C. and a time condition of 10 to 120 seconds.

Thereafter, an adherend such as copper foil is disposed on the second resin layer on the surface layer side of the curable resin laminate, and heated and pressurized using a vacuum laminator or a vacuum press machine to form a conductor layer on the second resin layer. Thereafter, the curable resin laminate is thermally cured by an appropriate method.

In the thermal curing step, for example, the curable resin laminate is heated at 100 to 220° C. for 30 to 120 minutes in a hot air circulating drying furnace to cause a thermosetting reaction, so that a cured product is formed.

The curable resin laminate and the dry film of the present invention are suitably used for forming an insulating film on a circuit board, and are suitably used for forming an interlayer adhesive, an electromagnetic wave shield layer, or an interlayer insulating layer.

Examples of Specific Embodiments

Hereinafter, examples of specific embodiments of the present invention will be described.

The present invention according to the following embodiments I and II can provide a curable resin laminate useful for forming an insulating layer having low dielectric properties and excellent adhesion (peel strength) to a conductor layer.

Embodiment I

The invention according to an embodiment I is
a curable resin laminate including a first resin layer and a second resin layer laminated on at least one main surface of the first resin layer, wherein
the second resin layer has a thickness of 5 to 35% of the total thickness of the first resin layer and the second resin layer,
the first resin layer contains (A1) a polyphenylene ether and (B1) a filler,
the second resin layer contains (A2) a polyphenylene ether, and has a Young's modulus ($YM_2$), as a cured product, of 3.0 GPa or less,
the relationship between a Young's modulus ($YM_1$) of the cured product of the first resin layer and the Young's modulus ($YM_2$) of the cured product of the second resin layer is $YM_1>YM_2$, and (A1) the polyphenylene ether and (A2) the polyphenylene ether are polyphenylene ethers obtained from raw material phenols containing phenols that satisfy at least the condition 1 and having a slope that is less than 0.6, calculated by a conformation plot.

(Condition 1)

Having hydrogen atoms at ortho and para positions

The invention according to the embodiment I may be a dry film including the curable resin laminate.

The invention according to the embodiment I may be a cured product composed of the curable resin laminate.

The invention according to the embodiment I may be an electronic component including the cured product.

Embodiment II

The invention according to an embodiment II is a curable resin laminate including a first resin layer and a second resin layer laminated on at least one main surface of the first resin layer, wherein the second resin layer has a thickness of 5 to 35% of the total thickness of the first resin layer and the second resin layer, the first resin layer contains (A1) a polyphenylene ether and (B1) a filler, the second resin layer contains (A2) a polyphenylene ether and has a melt viscosity ($MV_2$) at 140° C. of 40,000 dPa·s or less, the relationship between a melt viscosity ($MV_1$) of the first resin layer at 140° C. and the melt viscosity ($MV_2$) of the second resin layer at 140° C. is $MV_1>MV_2$, and (A1) the polyphenylene ether and (A2) the polyphenylene ether are polyphenylene ethers obtained from raw material phenols containing phenols that satisfy at least the condition 1 and having a slope that is less than 0.6, calculated by a conformation plot.

(Condition 1)

Having hydrogen atoms at ortho and para positions

The invention according to the embodiment II may be a dry film including the curable resin laminate.

The invention according to the embodiment II may be a cured product including the curable laminate.

The invention according to the embodiment II may be an electronic component including the cured product.

EXAMPLES

Hereinafter, the present invention will be described in more detail with reference to Examples and Comparative Examples, but the present invention is not limited to the description below at all.

<<<Synthesis of PPE Resin>>>

<Synthesis of PPE-1 (Branched PPE Resin)>

In a 3-L two-necked recovery flask, 2.6 g of di-μ-hydroxo-bis[(N,N,N',N'-tetramethylethylenediamine) copper (II)] chloride (Cu/TMEDA) and 3.18 mL of tetramethylethylenediamine (TMEDA) were added and sufficiently dissolved, and oxygen was fed at 10 ml/min. A raw material solution was prepared by dissolving 105 g of 2,6-dimethylphenol and 13 g of 2-allylphenol, which are raw material phenols, in 1.5 L of toluene. This raw material solution was added dropwise to the flask and reacted at 40° C. for 6 hours while being stirred at a rotation speed of 600 rpm. After completion of the reaction, the mixture was reprecipitated with a mixed solution of 20 L of methanol and 22 mL of concentrated hydrochloric acid, taken out by filtration, and dried at 80° C. for 24 hours to obtain PPE-1 as a branched PPE resin.

PPE-1 had a number average molecular weight of 20,000 and a weight average molecular weight of 60,000.

The slope of the conformation plot of PPE-1 was 0.31.

<Synthesis of PPE-2 (Branched PPE Resin)>

In a 3-L two-necked recovery flask, 2.6 g of di-μ-hydroxo-bis[(N,N,N',N'-tetramethylethylenediamine) copper (II)] chloride (Cu/TMEDA) and 3.18 mL of tetramethylethylenediamine (TMEDA) were added and sufficiently dissolved, and oxygen was fed at 10 ml/min. A raw material solution was prepared by dissolving 105 g of 2,6-dimethylphenol, which is a raw material phenol, and 4.89 g of orthocresol in 1.5 L of toluene. This raw material solution was added dropwise to the flask and reacted at 40° C. for 6 hours while being stirred at a rotation speed of 600 rpm. After completion of the reaction, the mixture was reprecipitated with a mixed solution of 20 L of methanol and 22 mL of concentrated hydrochloric acid, taken out by filtration, and dried at 80° C. for 24 hours to obtain a branched PPE resin.

To a 1-L two-necked recovery flask equipped with a dropping funnel, 50 g of branched PPE resin, 4.8 g of allyl bromide as a modifying compound, and 300 mL of NMP were added, and the mixture was stirred at 60° C. To the solution, 5 mL of a 5-M aqueous NaOH solution was added dropwise. Thereafter, the mixture was further stirred at 60° C. for 5 hours. Then, the reaction solution was neutralized with hydrochloric acid, then reprecipitated in 5 L of methanol, and taken out by filtration, washed 3 times with a mixed solution of methanol and water in a mass ratio of 80:20, and then dried at 80° C. for 24 hours to obtain PPE-2 as a branched PPE resin.

PPE-2 had a number average molecular weight of 19,000 and a weight average molecular weight of 66,500.

The slope of the conformation plot of PPE-2 was 0.33.

<Synthesis of Unbranched PPE Resin>

An unbranched PPE resin was obtained based on the same synthesis method as that for PPE-1 except that 34 mL of water was added to a raw material solution in which 7.6 g of 2-allyl-6-methylphenol and 34 g of 2,6-dimethylphenol, which are raw material phenols, were dissolved in 0.23 L of toluene.

The unbranched PPE resin had a number average molecular weight of 1,000 and a weight average molecular weight of 2,000.

The slope of the conformation plot of the unbranched PPE resin was unmeasurable.

The number average molecular weight (Mn) and weight average molecular weight (Mw) of each PPE resin were determined by gel permeation chromatography (GPC). In GPC, Shodex K-805L was used as a column, the column temperature was 40° C., the flow rate was 1 mL/min, the eluent was chloroform, and the standard substance was polystyrene.

<Solvent Solubility of PPE Resin>

The solvent solubility of each PPE resin was investigated.

The branched PPE resins-1 and -2 were soluble in cyclohexanone.

The unbranched PPE resin was not soluble in cyclohexanone and was soluble in chloroform.

<<<Preparation of Curable Composition and Production of Dry Film>>>

Varnish and a dry film of a curable composition according to each Example and each Comparative Example were obtained as follows.

Example 1

<Preparation of Curable Composition for First Resin Layer>

To 100 parts by mass of PPE-1 and 49 parts by mass of styrene elastomer (trade name "H1051", manufactured by Asahi Kasei Corporation), 540 parts by mass of cyclohexanone as a solvent was added, mixed at 40° C. for 30 minutes, and stirred to complete dissolution. To the PPE resin solution thus obtained, 60 parts by mass of TAIC (manufactured by Mitsubishi Chemical Corporation) as a crosslinking curing agent, 534 parts by mass of a spherical silica filler (trade name "SC 2500-SVJ", manufactured by Admatechs Co., Ltd.), and 16 parts by mass of a maleimide resin (trade name "BMI-3000J", manufactured by Designer Molecules Inc., Mw=3,000) were added and mixed, and then dispersed with a three-roll mill. Finally, 3 parts by mass of α,α'-bis(t-butylperoxy-m-isopropyl)benzene (trade name "Perbutyl P-40", manufactured by NOF CORPORATION) as a peroxide was blended thereto, and the mixture was stirred with a magnetic stirrer. As described above, varnish of the curable composition for a first resin layer of Example 1 was obtained.

Then, the varnish of the curable composition for the first resin layer of Example 1 was applied onto a PET film (trade name "TN-200", manufactured by Toyobo Co., Ltd.) having a thickness of 100 μm using an applicator such that the thickness of the resin layer after drying was 29 μm, and the varnish was dried at 90° C. for 5 minutes to prepare a dry film including the first resin layer of Example 1. In addition, for measurement of melt viscosity and Young's modulus, a dry film was prepared under the same conditions as described above so that the thickness of the resin layer after drying was 25 μm.

<Measurement of Melt Viscosity of First Resin Layer>

Twenty sheets of dry films including the first resin layer of Example 1 having a thickness of 25 μm were prepared. By using a vacuum laminator MVLP-500 manufactured by MEIKI CO., LTD., lamination and PET film peeling were repeated so that the resin layers were in contact with each other, thereby preparing a test piece for melt viscosity measurement having a resin layer thickness of 500 μm. With this test piece, the melt viscosity at 140° C. was measured using a HAAKE rheometer (MARS 40) under the conditions of an oscillation heating method (5° C./min), a measurement temperature range: 70 to 200° C., a frequency: 1 Hz, a stress control: 3 Pa, parallel plates: 20 mm, a gap: 450 μm, and a sample size: 2.5×2.5 cm.

<Measurement of Young's Modulus of Cured Film of First Resin Layer>

A dry film including the first resin layer of Example 1 having a thickness of 25 μm was disposed so that the first resin layer was in contact with a glossy surface of low-roughness copper foil (FV-WS, manufactured by Furukawa Electric Co., Ltd.): Rz=1.2 μm), and the dry film was laminated with a vacuum laminator. Then, the PET film was peeled off, and heated to 200° C. and then cured for 60 minutes, with nitrogen completely filled, in an inert oven to obtain a cured film including the first resin layer. The cured film was cut into a length of 8 cm and a width of 0.5 cm, and subjected to a tensile test under the following conditions, and Young's modulus was determined from the slope of strain when the stress in the stress-strain diagram was from 5 MPa to 10 MPa.

[Measurement Conditions]

Tester: tensile tester EZ-SX (manufactured by Shimadzu Corporation)
Distance between chucks: 50 mm
Test speed: 1 mm/min
Elongation calculation: (tensile movement amount/distance between chucks)×100

<Preparation of Curable Composition for Second Resin Layer>

Varnish of the curable composition for a second resin layer of Example 1 was obtained in the same manner as described above except that the content of the spherical silica filler in the curable composition for the first resin layer was changed to 0 parts by mass.

<Production of Second Resin Layer (Dry Film Including Second Resin Layer)>

Then, varnish of the curable composition for the second resin layer of Example 1 was applied onto a PET film having a thickness of 100 μm using an applicator such that the thickness of the resin layer after drying was 2 μm, and the varnish was dried at 90° C. for 5 minutes to prepare a dry film including the second resin layer of Example 1. In addition, for measurement of melt viscosity and measurement of Young's modulus, a dry film was prepared under the same conditions as described above so that the thickness of the resin layer after drying was 25 μm.

<Measurement of Melt Viscosity of Second Resin Layer>

Twenty sheets of dry films including the second resin layer of Example 1 having a thickness of 25 μm were prepared, and the melt viscosity at 140° C. was measured in the same manner as in the measurement of the melt viscosity of the first resin layer described above.

<Measurement of Young's Modulus of Cured Film of Second Resin Layer>

Using a dry film including the second resin layer of Example 1 having a thickness of 25 μm, Young's modulus of the cured film of the second resin layer was determined in the same manner as in the measurement of Young's modulus of the first resin layer described above.

<Production of Curable Resin Laminate (Dry Film Including First Resin Layer and Second Resin Layer)>

A dry film including the first resin layer and a dry film including the second resin layer described above were disposed so that the resin layers were in contact with each other, and bonded to each other using a vacuum laminator MVLP-500 manufactured by MEIKI CO., LTD., thereby obtaining a dry film of Example 1.

Examples 2 to 13, Comparative Examples 1 to 6

The curable compositions for first and second resin layers were prepared in the same manner as in Example 1 except that the components and the contents were set to the numerical values shown in the table. Young's modulus and the melt viscosity of each cured film of the first resin layer and the second resin layer according to Examples 2 to 13 and Comparative Examples 1 to 6 were measured. A dry film including the first resin layer and the second resin layer was prepared.

In the first resin layer and the second resin layer according to Comparative Example 3, a cured film was not able to be prepared and the melt viscosity was not able to be measured.

Example 14

A dry film including the first resin layer and a dry film including the second resin layer were bonded to each other, a PET film on the first resin layer side was then peeled off, and a dry film including the second resin layer was further bonded to prepare a dry film according to Example 14.

Comparative Examples 7 to 13

A dry film including the first resin layer was prepared, and a PET film was bonded so as to be in contact with the resin layer to prepare dry films according to Comparative Examples 7 to 13.

<<<Preparation of Cured Product>>>

The PET film on the first resin layer side of each of the dry films of Examples and Comparative Examples was peeled off, and then the dry film was disposed so that the first resin layer was in contact with the glossy surface of a low-roughness copper foil (FV-WS, manufactured by Furukawa Electric Co., Ltd.), Rz=1.2 μm), and laminated with a vacuum laminator. Then, the remaining PET film was peeled off, and then heated to 200° C. and cured for 60 minutes, with nitrogen completely filled, in an inert oven to obtain cured films of Examples and Comparative Examples.

In the dry film of Comparative Example 3, a cured film was not able to be produced.

<<<Evaluation>>>

The cured films of the cured products described above were evaluated as follows.

<<CTE: Thermal Expansion Coefficient>>

The cured films were each cut out into a length of 3 cm and a width of 0.3 cm, and the measurement was performed using a TMA (Thermomechanical Analysis) Q400 manufactured by TA Instruments, in a tensile mode, under 16 mm between chucks and a load of 30 mN, in a nitrogen atmosphere, and in conditions that the temperature was raised to 20 to 250° C. at 5° C./min and then the temperature was lowered to 250 to 20° C. at 5° C./min. An average thermal expansion coefficient from 100° C. to 50° C. during the temperature decrease was obtained.

<<Young's Modulus and Breaking Strain>>

The cured films were each cut into a length of 8 cm and a width of 0.5 cm, and Young's modulus and breaking strain were measured under the following conditions. Young's modulus was determined from the slope of strain when the stress in the obtained stress-strain diagram was from 5 MPa to 10 MPa.

[Measurement Conditions]
 Tester: tensile tester EZ-SX (manufactured by Shimadzu Corporation)
 Distance between chucks: 50 mm
 Test speed: 1 mm/min
 Elongation calculation: (tensile movement amount/distance between chucks)×100

<<Dielectric Constant>>

The relative permittivity Dk and the dielectric loss tangent Df were measured according to the following method.

The cured films were each cut into a length of 80 mm and a width of 45 mm, which was measured as a test piece by an SPDR (Split Post Dielectric Resonator) resonator method. As the measuring instrument, a vector network analyzer E5071C manufactured by Keysight Technologies Inc, an SPDR resonator, and a calculation program manufactured by QWED were used. The conditions included a frequency of 10 GHz and a measurement temperature of 25° C.

<<Peel Strength>>

The surface of a copper-clad laminate (copper foil on the whole surface) was pretreated with CZ-8100 manufactured by MEC Co., Ltd. Then, the PET film on the first resin layer side of the dry films of Examples 1 to 13 and Comparative Examples 1 to 6, and the PET film on one side of Example 14 and Comparative Examples 7 to 13 were peeled off, and the exposed resin layer and the treated surface were bonded so as to be in contact with each other with a vacuum laminator. Thereafter, the remaining PET film was peeled off, and low-roughness copper foil (FV-WS, manufactured by Furukawa Electric Co., Ltd., Rz=1.2 μm) was bonded onto the exposed resin layer with a vacuum laminator such that the roughness surface was in contact with the exposed resin layer. Thereafter, the resin layer was heated to 200° C. and then cured for 60 minutes, with nitrogen completely filled, in an inert oven to prepare a substrate for peel strength evaluation.

A cut having a width of 10 mm and a length of 100 mm was made in the low-roughness copper foil portion of the substrate for peel strength evaluation described above, one end of the cut was peeled off and gripped with a gripper, and the 900 peel strength was measured under the following conditions.

[Measurement Conditions]
 Tester: tensile tester EZ-SX (manufactured by Shimadzu Corporation)
 Test speed: 1 mm/min

TABLE 1

| | | Example | | | | | | |
|---|---|---|---|---|---|---|---|---|
| | | 1 | 2 | 3 | 4 | 5 | 6 | 7 |
| First Resin Layer | Thickness [μm] | 29 | 29 | 24 | 29 | 24 | 24 | 24 |
| | (A1)PPE-1 | 100 | 100 | 100 | 100 | 100 | 100 | 100 |
| | (A1)PPE-2 | 0 | 0 | 0 | 0 | 0 | 0 | 0 |
| | Unbranched PPE | 0 | 0 | 0 | 0 | 0 | 0 | 0 |
| | Cyclohexanone | 540 | 540 | 540 | 540 | 540 | 540 | 540 |
| | Chloroform | 0 | 0 | 0 | 0 | 0 | 0 | 0 |
| | (B1)SC2500-SVJ | 534 | 534 | 534 | 534 | 534 | 534 | 534 |
| | H1051 | 49 | 49 | 49 | 49 | 49 | 49 | 49 |
| | BMI-3000J | 16 | 16 | 16 | 16 | 16 | 16 | 16 |
| | TAIC | 60 | 60 | 60 | 60 | 60 | 60 | 60 |
| | Perbutyl P-40 | 3 | 3 | 3 | 3 | 3 | 3 | 3 |
| | Total (Solid Content) | 762 | 762 | 762 | 762 | 762 | 762 | 762 |
| | Filler Amount [wt %] | 70% | 70% | 70% | 70% | 70% | 70% | 70% |
| Second Resin Layer | Thickness [μm] | 2 | 6 | 6 | 14 | 6 | 6 | 6 |
| | (A2)PPE-1 | 100 | 100 | 100 | 100 | 100 | 100 | 100 |
| | (A2)PPE-2 | 0 | 0 | 0 | 0 | 0 | 0 | 0 |

TABLE 1-continued

|  |  | | | | | | | |
|---|---|---|---|---|---|---|---|---|
|  | Unbranched PPE | 0 | 0 | 0 | 0 | 0 | 0 | 0 |
|  | Cyclohexanone | 540 | 540 | 540 | 540 | 540 | 540 | 540 |
|  | Chloroform | 0 | 0 | 0 | 0 | 0 | 0 | 0 |
|  | (B2)SC2500-SVJ | 0 | 0 | 0 | 0 | 12 | 25 | 98 |
|  | H1051 | 49 | 49 | 49 | 49 | 49 | 49 | 49 |
|  | BMI-3000J | 16 | 16 | 16 | 16 | 16 | 16 | 16 |
|  | TAIC | 60 | 60 | 60 | 60 | 60 | 60 | 60 |
|  | Perbutyl P-40 | 3 | 3 | 3 | 3 | 3 | 3 | 3 |
|  | Total (Solid Content) | 228 | 228 | 228 | 228 | 240 | 253 | 326 |
|  | Filler Amount [wt %] | 0% | 0% | 0% | 0% | 5% | 10% | 30% |
| Melt Viscosity at 140° C. | First Resin Layer [dPa · s] | 313100 | 313100 | 313100 | 313100 | 313100 | 313100 | 313100 |
|  | Second Resin Layer [dPa · s] | 25210 | 25210 | 25210 | 25210 | 23030 | 30900 | 32980 |
| Young's Modulus | Cured Product of First Resin Layer [GPa] | 6.2 | 6.2 | 6.2 | 6.2 | 6.2 | 6.2 | 6.2 |
|  | Cured Product of Second Resin Layer [GPa] | 1.7 | 1.7 | 1.7 | 1.7 | 1.9 | 2.5 | 2.6 |
| Curable Resin Laminate | Film Thickness of Second Resin Layer Relative to Thickness of Laminate (B)/(A + B) [%] | 6% | 17% | 20% | 33% | 20% | 20% | 20% |
|  | Filler Content Ratio of Second Layer to First Layer $M_{B2}/M_{B1}$ [%] | 0% | 0% | 0% | 0% | 7% | 14% | 43% |
| Evaluation | CTE α1 [ppm/° C.] | 6.8 | 9.2 | 13.2 | 18.1 | 13.0 | 10.0 | 5.5 |
|  | Young's Modulus [GPa] | 6.3 | 5.7 | 6.5 | 5.0 | 6.0 | 6.3 | 6.8 |
|  | Breaking Strain [%] | 1.2 | 1.8 | 1.5 | 1.7 | 1.3 | 1.2 | 1.3 |
|  | Dk (10 GHz) | 3.10 | 3.00 | 3.10 | 2.90 | 3.07 | 3.06 | 3.11 |
|  | Df (10 GHz) | 0.0016 | 0.0015 | 0.0016 | 0.0019 | 0.0020 | 0.0018 | 0.0019 |
|  | Peel Strength of Copper Foil [kN/cm] | 0.68 | 0.70 | 0.59 | 0.67 | 0.66 | 0.65 | 0.65 |

|  |  | Example | | | | | | |
|---|---|---|---|---|---|---|---|---|
|  |  | 8 | 9 | 10 | 11 | 12 | 13 | 14(3 layers) |
| First Resin Layer | Thickness [μm] | 24 | 25 | 25 | 25 | 25 | 29 | 15 |
|  | (A1)PPE-1 | 100 | 100 | 100 | 100 | 100 | 0 | 100 |
|  | (A1)PPE-2 | 0 | 0 | 0 | 0 | 0 | 100 | 0 |
|  | Unbranched PPE | 0 | 0 | 0 | 0 | 0 | 0 | 0 |
|  | Cyclohexanone | 540 | 540 | 540 | 540 | 540 | 540 | 540 |
|  | Chloroform | 0 | 0 | 0 | 0 | 0 | 0 | 0 |
|  | (B1)SC2500-SVJ | 534 | 98 | 185 | 229 | 344 | 534 | 534 |
|  | H1051 | 49 | 49 | 49 | 49 | 49 | 49 | 49 |
|  | BMI-3000J | 16 | 16 | 16 | 16 | 16 | 16 | 16 |
|  | TAIC | 60 | 60 | 60 | 60 | 60 | 60 | 60 |
|  | Perbutyl P-40 | 3 | 3 | 3 | 3 | 3 | 3 | 3 |
|  | Total (Solid Content) | 762 | 326 | 413 | 457 | 572 | 762 | 762 |
|  | Filler Amount [wt %] | 70% | 30% | 45% | 50% | 60% | 70% | 70% |
| Second Resin Layer | Thickness [μm] | 6 | 5 | 5 | 5 | 5 | 2 | 5 |
|  | (A2)PPE-1 | 100 | 100 | 100 | 100 | 100 | 0 | 100 |
|  | (A2)PPE-2 | 0 | 0 | 0 | 0 | 0 | 100 | 0 |
|  | Unbranched PPE | 0 | 0 | 0 | 0 | 0 | 0 | 0 |
|  | Cyclohexanone | 540 | 540 | 540 | 540 | 540 | 540 | 540 |
|  | Chloroform | 0 | 0 | 0 | 0 | 0 | 0 | 0 |
|  | (B2)SC2500-SVJ | 123 | 0 | 0 | 0 | 0 | 0 | 0 |
|  | H1051 | 49 | 49 | 49 | 49 | 49 | 49 | 49 |
|  | BMI-3000J | 16 | 16 | 16 | 16 | 16 | 16 | 16 |
|  | TAIC | 60 | 60 | 60 | 60 | 60 | 60 | 60 |
|  | Perbutyl P-40 | 3 | 3 | 3 | 3 | 3 | 3 | 3 |
|  | Total (Solid Content) | 351 | 228 | 228 | 228 | 228 | 228 | 228 |
|  | Filler Amount [wt %] | 35% | 0% | 0% | 0% | 0% | 0% | 0% |
| Melt Viscosity at 140° C. | First Resin Layer [dPa · s] | 313100 | 32980 | 45400 | 57210 | 100250 | 309550 | 313100 |
|  | Second Resin Layer [dPa · s] | 38560 | 25210 | 25210 | 25210 | 25210 | 25210 | 25210 |
| Young's Modulus | Cured Product of First Resin Layer [GPa] | 6.2 | 2.6 | 3.4 | 3.7 | 4.9 | 6.0 | 6.2 |
|  | Cured Product of Second Resin Layer [GPa] | 2.7 | 1.7 | 1.7 | 1.7 | 1.7 | 1.7 | 1.7 |
| Curable Resin Laminate | Film Thickness of Second Resin Layer Relative to Thickness of Laminate (B)/(A + B) [%] | 20% | 17% | 17% | 17% | 17% | 6% | 40% (20% + 20%) |

TABLE 1-continued

|  |  |  |  |  |  |  |  |  |
|---|---|---|---|---|---|---|---|---|
| Evaluation | Filler Content Ratio of Second Layer to First Layer $M_{B2}/M_{B1}$ [%] | 50% | 0% | 0% | 0% | 0% | 0% | 0% |
|  | CTE α1 [ppm/° C.] | 5.2 | 50.0 | 20.0 | 23.0 | 15.0 | 6.5 | 22.5 |
|  | Young's Modulus [GPa] | 7. | 3.5 | 4.5 | 5.0 | 5.8 | 6.3 | 5.0 |
|  | Breaking Strain [%] | 1.2 | 2.5 | 1.8 | 1.3 | 1.3 | 1.2 | 2.4 |
|  | Dk (10 GHz) | 3.13 | 2.81 | 2.90 | 3.01 | 3.08 | 3.10 | 2.90 |
|  | Df (10 GHz) | 0.0018 | 0.0019 | 0.0018 | 0.0017 | 0.0018 | 0.0016 | 0.0012 |
|  | Peel Strength of Copper Foil [kN/cm] | 0.65 | 0.60 | 0.61 | 0.63 | 0.65 | 0.68 | 0.50 |

TABLE 2

|  |  | Comparative Example | | | | | | |
|---|---|---|---|---|---|---|---|---|
|  |  | 1 | 2 | 3 | 4 | 5 | 6 | 7 |
| First Resin Layer | Thickness [μm] | 17 | 5 | 30 | 25 | 25 | 25 | 30 |
|  | (A1)PPE-1 | 100 | 100 | 0 | 100 | 100 | 100 | 100 |
|  | (A1)PPE-2 | 0 | 0 | 0 | 0 | 0 | 0 | 0 |
|  | Unbranched PPE | 0 | 0 | 100 | 0 | 0 | 0 | 0 |
|  | Cyclohexanone | 540 | 540 | 0 | 540 | 540 | 540 | 540 |
|  | Chloroform | 0 | 0 | 540 | 0 | 0 | 0 | 0 |
|  | (B1)SC2500-SVJ | 534 | 534 | 534 | 534 | 0 | 98 | 0 |
|  | H1051 | 49 | 49 | 49 | 49 | 49 | 49 | 49 |
|  | BMI-3000J | 16 | 16 | 16 | 16 | 16 | 16 | 16 |
|  | TAIC | 60 | 60 | 60 | 60 | 60 | 60 | 60 |
|  | Perbutyl P-40 | 3 | 3 | 3 | 3 | 3 | 3 | 3 |
|  | Total (Solid Content) | 762 | 762 | 762 | 762 | 228 | 326 | 228 |
|  | Filler Amount [wt %] | 70% | 70% | 70% | 70% | 0% | 30% | 0% |
| Second Resin Layer | Thickness [μm] | 14 | 25 | 2 | 5 | 5 | 5 |  |
|  | (A2)PPE-1 | 100 | 100 | 0 | 100 | 100 | 100 |  |
|  | (A2)PPE-2 | 0 | 0 | 0 | 0 | 0 | 0 |  |
|  | Unbranched PPE | 0 | 0 | 100 | 0 | 0 | 0 |  |
|  | Cyclohexanone | 540 | 540 | 0 | 540 | 540 | 540 |  |
|  | Chloroform | 0 | 0 | 540 | 0 | 0 | 0 |  |
|  | (B2)SC2500-SVJ | 0 | 0 | 0 | 229 | 123 | 123 |  |
|  | H1051 | 49 | 49 | 49 | 49 | 49 | 49 |  |
|  | BMI-3000J | 16 | 16 | 16 | 16 | 16 | 16 |  |
|  | TAIC | 60 | 60 | 60 | 60 | 60 | 60 |  |
|  | Perbutyl P-40 | 3 | 3 | 3 | 3 | 3 | 3 |  |
|  | Total (Solid Content) | 228 | 228 | 228 | 457 | 351 | 351 |  |
|  | Filler Amount [wt %] | 0% | 0% | 0% | 50% | 35% | 35% |  |
| Melt Viscosity at 140° C. | First Resin Layer [dPa·s] | 313100 | 313100 | — | 313100 | 25210 | 32980 | 25210 |
|  | Second Resin Layer [dPa·s] | 25210 | 25210 | — | 57210 | 38560 | 38560 | — |
| Young's Modulus | Cured Product of First Resin Layer [GPa] | 6.2 | 6.2 | — | 6.2 | 1.7 | 2.6 | 1.7 |
|  | Cured Product of Second Resin Layer [GPa] | 1.7 | 1.7 | — | 3.7 | 2.7 | 2.7 | — |
| Curable Resin Laminate | Film Thickness of Second Resin Layer Relative to Thickness of Laminate (B)/(A + B) [%] | 45% | 83% | 6% | 17% | 17% | 17% | — |
|  | Filler Content Ratio of Second Layer to First Layer $M_{B2}/M_{B1}$ [%] | 0% | 0% | 0% | 72% | — | 117% | — |
| Evaluation | CTE α1 [ppm/° C.] | 26.5 | 80.0 | — | 6.8 | 105.0 | 98.5 | 120.0 |
|  | Young's Modulus [GPa] | 4.9 | 3.0 | — | 5.8 | 2.3 | 2.6 | 1.7 |
|  | Breaking Strain [%] | 1.5 | 3.5 | — | 1.3 | 4.2 | 1.8 | 4.9 |
|  | Dk (10 GHz) | 3.10 | 2.81 | — | 3.12 | 2.74 | 2.92 | 2.70 |
|  | Df (10 GHz) | 0.0020 | 0.0019 | — | 0.0018 | 0.0020 | 0.0019 | 0.0021 |
|  | Peel Strength of Copper Foil [kN/cm] | 0.48 | 0.47 | — | 0.45 | 0.44 | 0.45 | 0.45 |

|  |  | Comparative Example | | | | | |
|---|---|---|---|---|---|---|---|
|  |  | 8 | 9 | 10 | 11 | 12 | 13 |
| First Resin Layer | Thickness [μm] | 30 | 30 | 30 | 30 | 30 | 30 |
|  | (A1)PPE-1 | 100 | 100 | 100 | 100 | 100 | 100 |
|  | (A1)PPE-2 | 0 | 0 | 0 | 0 | 0 | 0 |
|  | Unbranched PPE | 0 | 0 | 0 | 0 | 0 | 0 |
|  | Cyclohexanone | 540 | 540 | 540 | 540 | 540 | 540 |

TABLE 2-continued

| | | | | | | | |
|---|---|---|---|---|---|---|---|
| | Chloroform | 0 | 0 | 0 | 0 | 0 | 0 |
| | (B1)SC2500-SVJ | 12 | 25 | 98 | 229 | 344 | 534 |
| | H1051 | 49 | 49 | 49 | 49 | 49 | 49 |
| | BMI-3000J | 16 | 16 | 16 | 16 | 16 | 16 |
| | TAIC | 60 | 60 | 60 | 60 | 60 | 60 |
| | Perbutyl P-40 | 3 | 3 | 3 | 3 | 3 | 3 |
| | Total (Solid Content) | 240 | 253 | 326 | 457 | 572 | 762 |
| | Filler Amount [wt %] | 5% | 10% | 30% | 50% | 60% | 70% |
| Second Resin Layer | Thickness [μm] | | | | | | |
| | (A2)PPE-1 | | | | | | |
| | (A2)PPE-2 | | | | | | |
| | Unbranched PPE | | | | | | |
| | Cyclohexanone | | | | | | |
| | Chloroform | | | | | | |
| | (B2)SC2500-SVJ | | | | | | |
| | H1051 | | | | | | |
| | BMI-3000J | | | | | | |
| | TAIC | | | | | | |
| | Perbutyl P-40 | | | | | | |
| | Total (Solid Content) | | | | | | |
| | Filler Amount [wt %] | | | | | | |
| Melt Viscosity at 140° C. | First Resin Layer [dPa·s] | 23030 | 30900 | 32980 | 57210 | 100250 | 313100 |
| | Second Resin Layer [dPa·s] | — | — | — | — | — | — |
| Young's Modulus | Cured Product of First Resin Layer [GPa] | 1.9 | 2.5 | 3.9 | 3.7 | 4.9 | 6.2 |
| | Cured Product of Second Resin Layer [GPa] | — | — | — | — | — | — |
| Curable Resin Laminate | Film Thickness of Second Resin Layer Relative to Thickness of Laminate (B)/(A + B) [%] | — | — | — | — | — | — |
| | Filler Content Ratio of Second Layer to First Layer $M_{B2}/M_{B1}$ [%] | — | — | — | — | — | — |
| Evaluation | CTE α1 [ppm/° C.] | 116.0 | 117.0 | 103.0 | 74.0 | 34.0 | 6.7 |
| | Young's Modulus [GPa] | 1.9 | 2.5 | 3.9 | 3.7 | 4.9 | 6.2 |
| | Breaking Strain [%] | 4.6 | 4.0 | 3.3 | 1.6 | 1.2 | 1.0 |
| | Dk (10 GHz) | 2.70 | 2.75 | 2.85 | 3.07 | 3.17 | 3.20 |
| | Df (10 GHz) | 0.0021 | 0.0020 | 0.0022 | 0.0020 | 0.0021 | 0.0020 |
| | Peel Strength of Copper Foil [kN/cm] | 0.45 | 0.44 | 0.49 | 0.42 | 0.35 | 0.25 |

The invention claimed is:

1. A curable resin laminate, comprising:
a first resin layer including a first curable composition comprising a polyphenylene ether and a filler; and
a second resin layer including a second curable composition and laminated on at least one surface of a main surface of the first resin layer,
wherein the second resin layer has a thickness in a range of 5 to 35% relative to a total thickness of the first resin layer and the second resin layer, the filler in the first curable composition of the first resin layer has a content of 30% by mass or more relative to a total solid content in the first curable composition, the second curable composition includes a polyphenylene ether and does not contain a filler or includes a filler in a content of 40% by mass or less relative to a total solid content in the second curable composition such that the content of the filler in the first curable composition and the content of the filler in the second curable composition satisfy a relationship $M_{B1} > M_{B2}$, where $M_{B1}$ is the content of the filler in the first curable composition and $M_{B2}$ is the content of the filler in the second curable composition, and the polyphenylene ether in the first curable composition and the polyphenylene ether in the second curable composition are polyphenylene ethers obtained from raw material phenols including phenols having hydrogen atoms at ortho and para positions and having a slope of less than 0.6 calculated by a conformation plot.

2. A dry film, comprising:
the curable resin laminate of claim 1.

3. A cured product produced by a process comprising curing a product comprising the curable resin laminate of claim 1.

4. An electronic component, comprising:
the cured product of claim 3.

5. A cured product obtained by a process comprising curing the dry film of claim 2.

6. An electronic component, comprising:
the cured product of claim 5.

* * * * *